Sept. 5, 1961 J. R. DINNING 2,998,866
ELECTRICAL CONTROLS
Filed Aug. 5, 1959 9 Sheets-Sheet 1
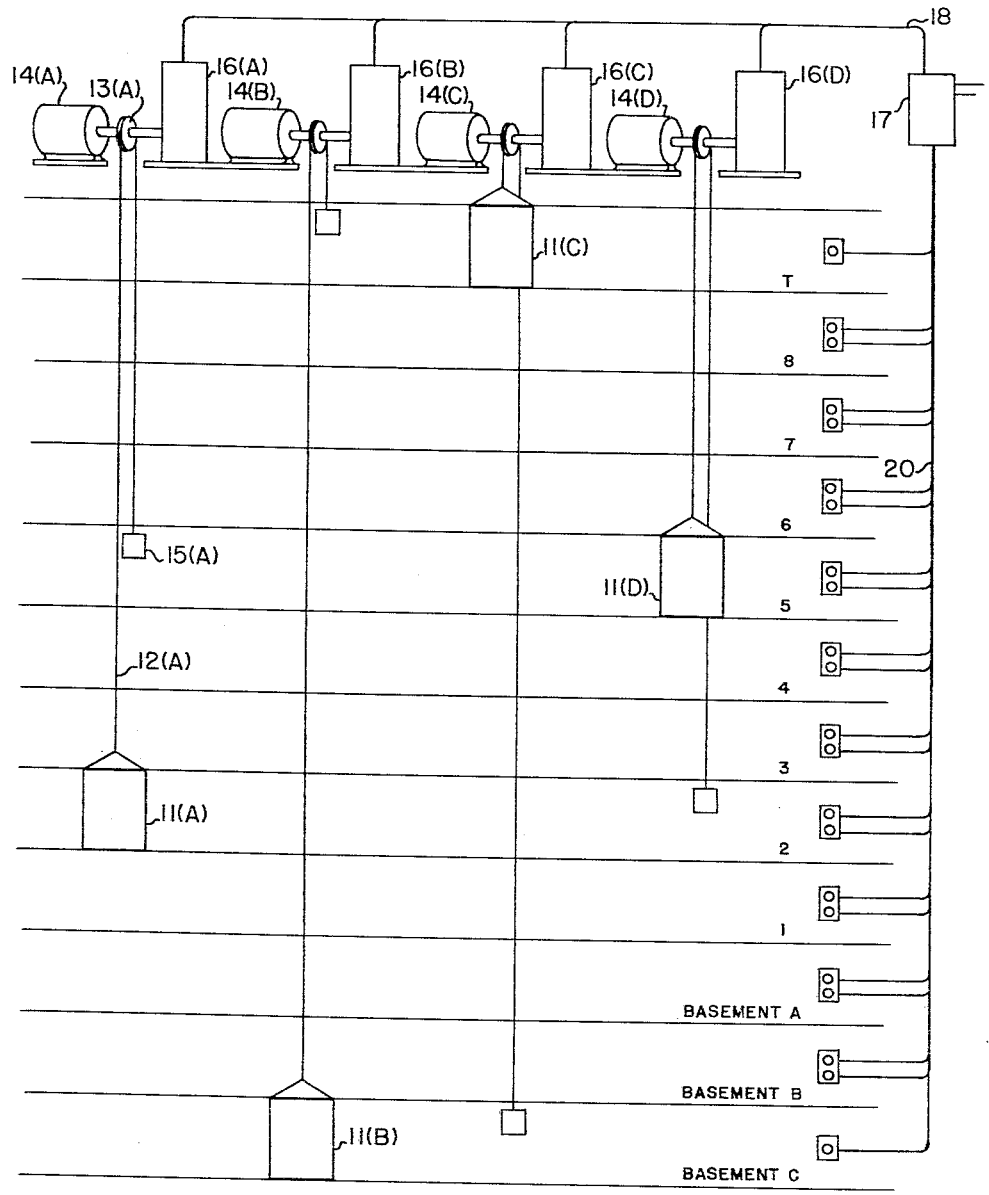
Fig. I
INVENTOR.
JOHN R. DINNING
BY
Marshall, Marshall & Yeasting
ATTORNEYS

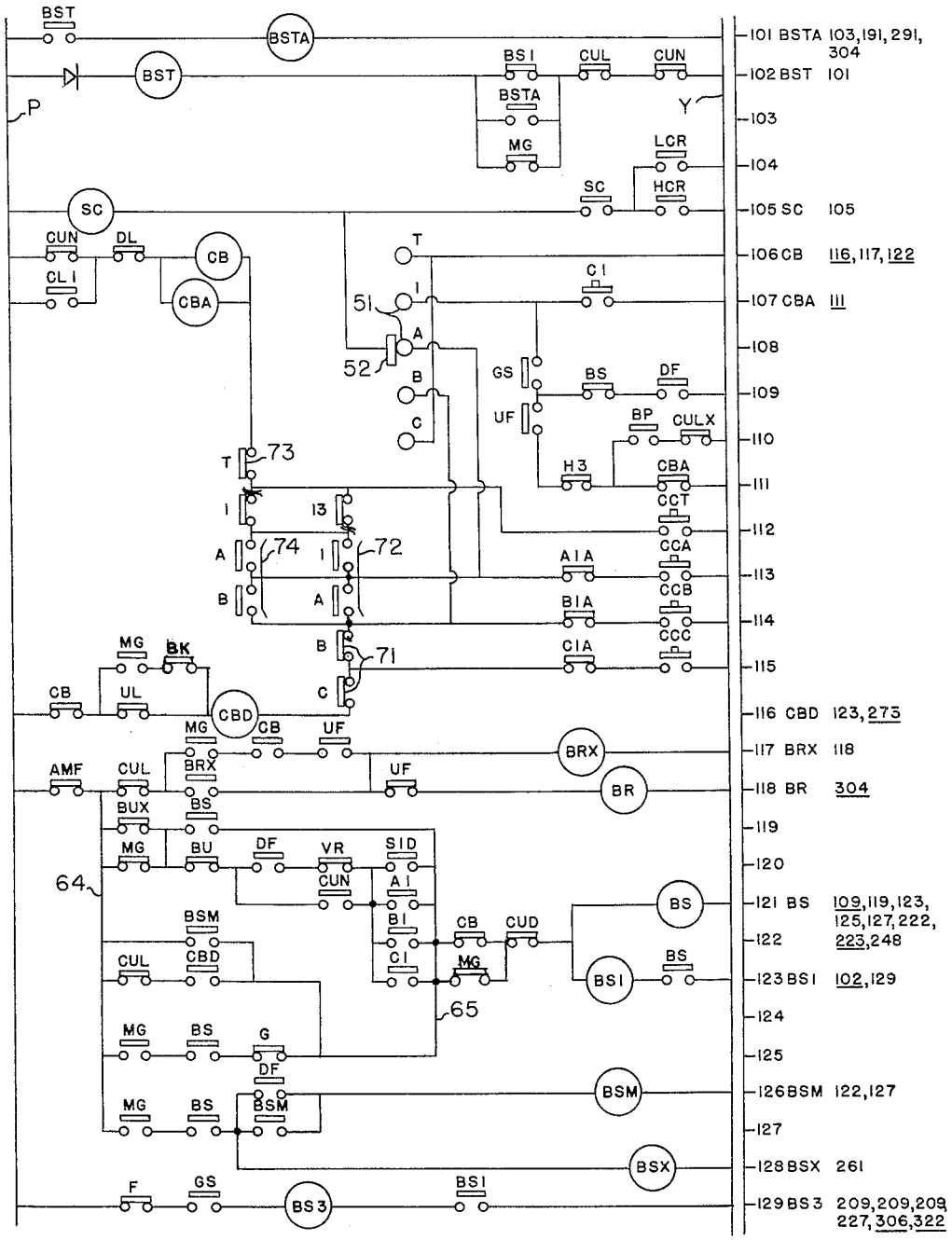
Fig. II

Sept. 5, 1961     J. R. DINNING     2,998,866
ELECTRICAL CONTROLS
Filed Aug. 5, 1959     9 Sheets—Sheet 3
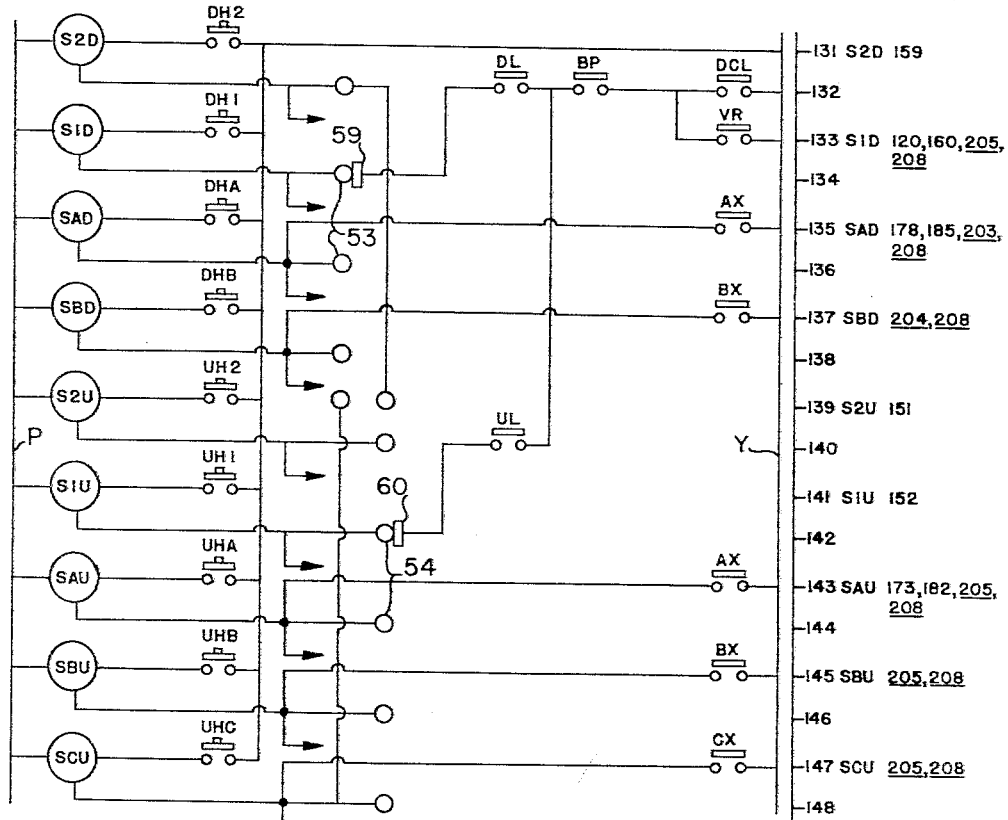
Fig. III
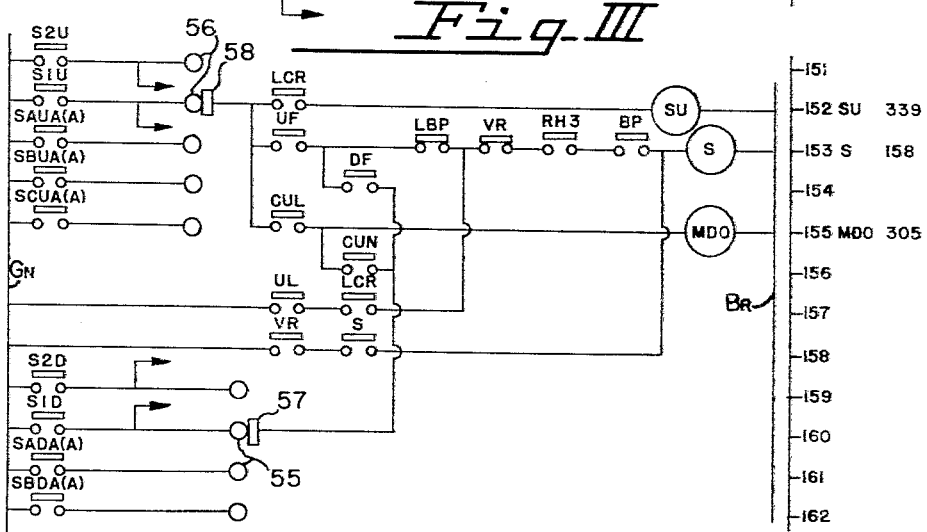
Fig. IV
INVENTOR.
JOHN R. DINNING
BY
Marshall, Marshall & Yeasting
ATTORNEYS

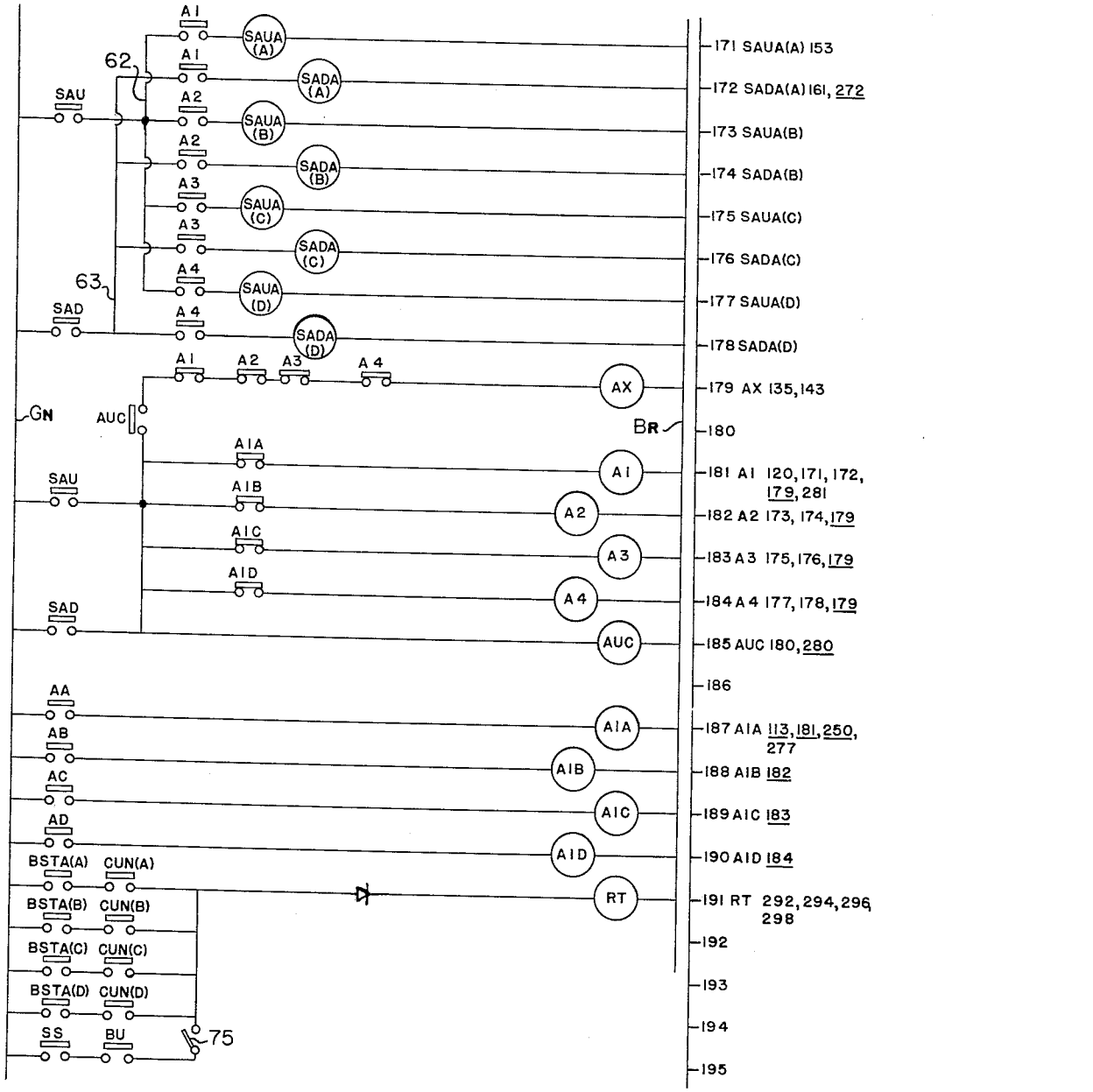
Fig. V

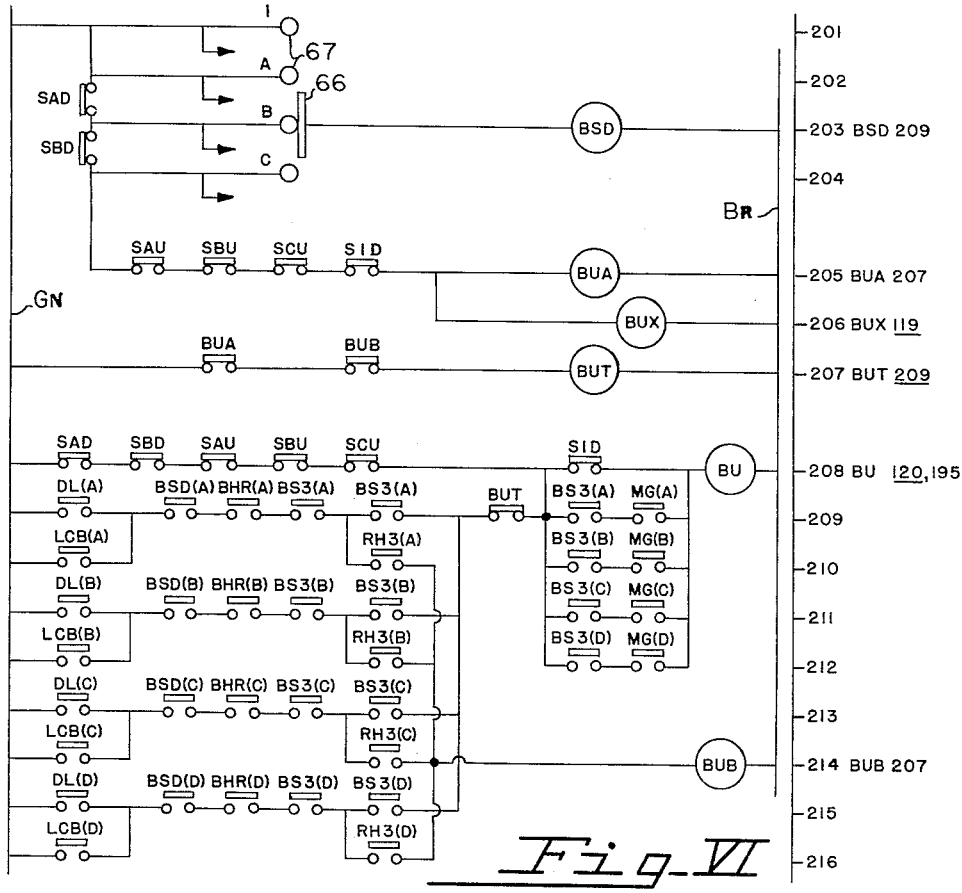
Fig. VI
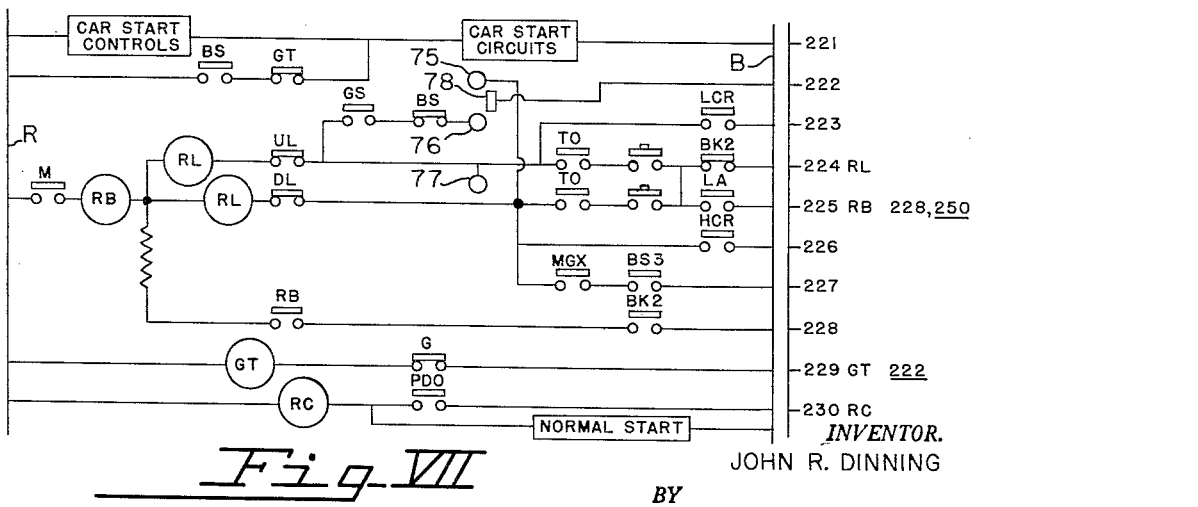
Fig. VII

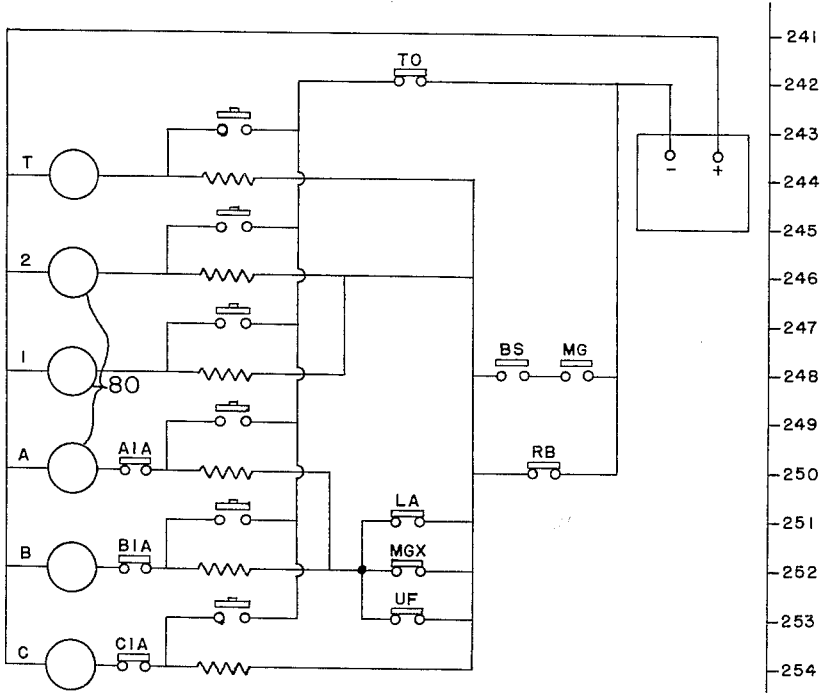
_Fig. VIII_
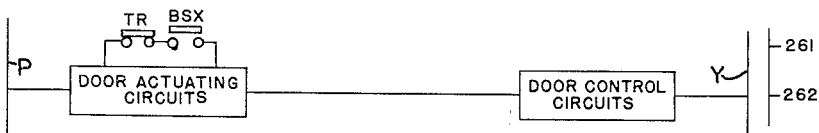
_Fig. IX_

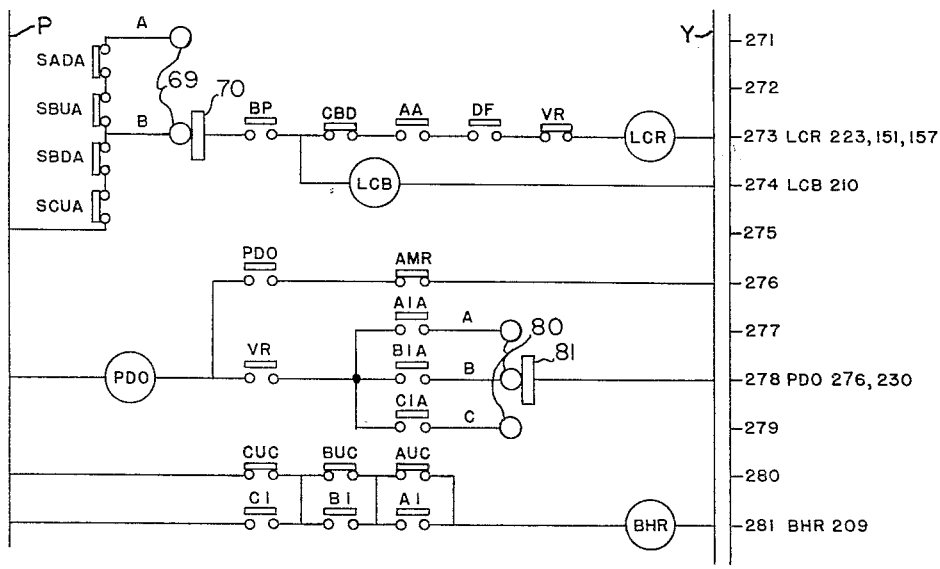
Fig. XI
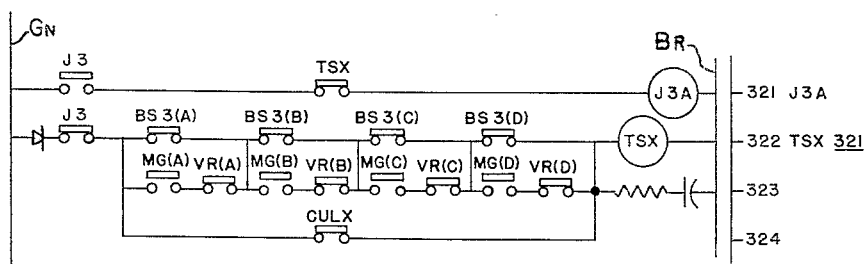
Fig. XII
INVENTOR.
JOHN R. DINNING
BY
Marshall, Marshall & Yeasting
ATTORNEYS

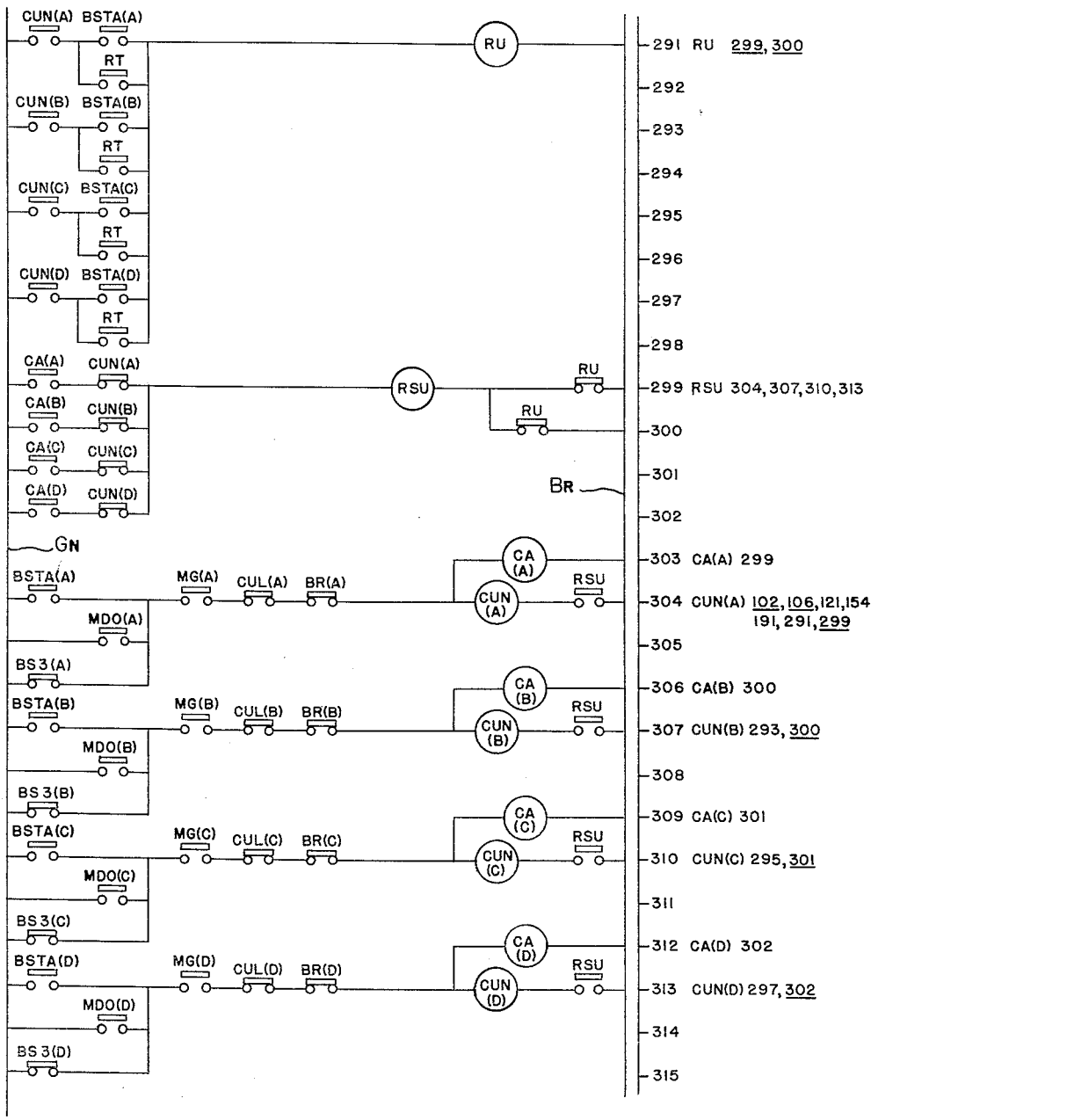
Fig. XI

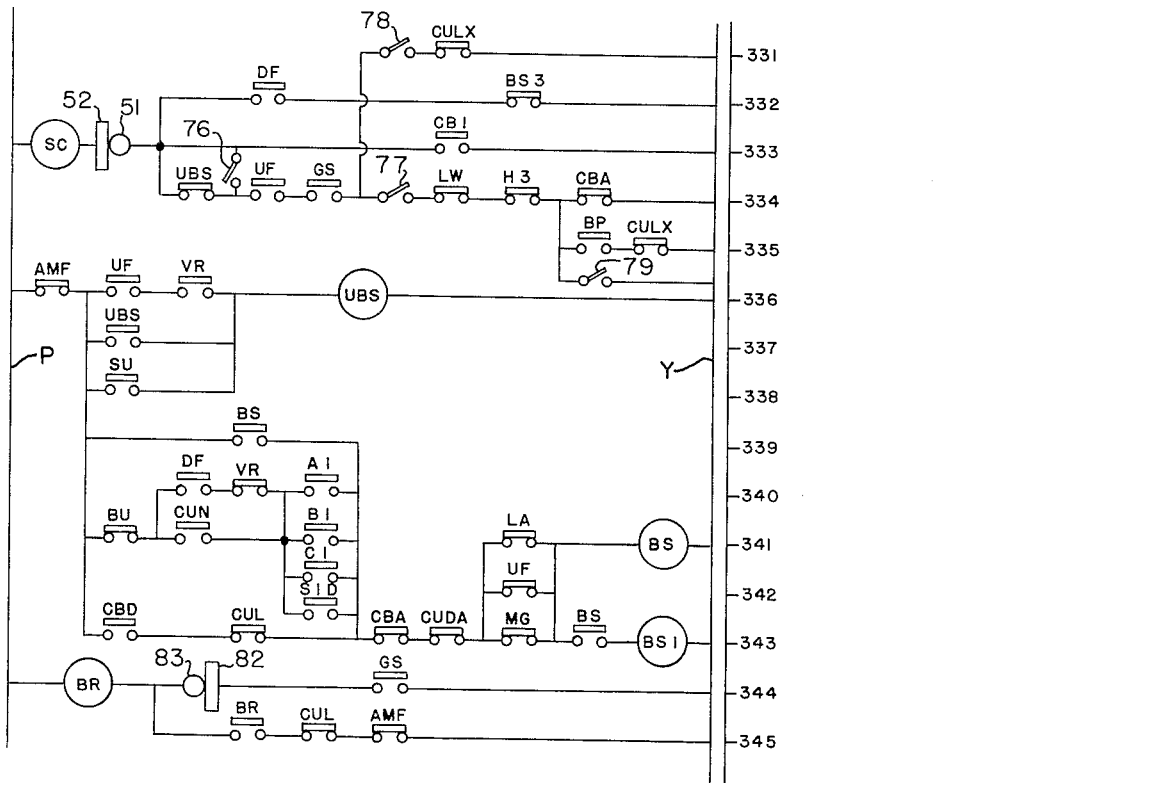
Fig. XIII

United States Patent Office 2,998,866
Patented Sept. 5, 1961

2,998,866
ELECTRICAL CONTROLS
John R. Dinning, Toledo, Ohio, assignor to Toledo Scale Corporation, Toledo, Ohio, a corporation of Ohio
Filed Aug. 5, 1959, Ser. No. 831,736
28 Claims. (Cl. 187—29)

This invention relates to controls for elevator systems having floors beyond a dispatching floor.

Heretofore the problem of providing adequate service to a floor displaced in a given direction from a dispatching floor from which cars are dispatched in the opposite direction has been considered. Usually the solutions have subordinated service to the floor beyond in an effort to maintain service in the dispatching direction by permitting a car to respond to a call for service to the floor only under certain limited conditions. It has been common to bar the car from floor beyond service when it has entered the dispatching sequence, or when another car is conditioned for or in the process of providing such service. These expedients have been satisfactory in the past since the ordinary floor beyond a dispatching floor has a type of traffic which is of a low priority nature such as building service.

Disposition of elevators returning to a dispatching floor from a floor beyond has also been considered. Such elevators have been arranged to stop on each return, or to stop except when a call is registered in the car for a floor displaced from the dispatching floor in the dispatching direction, or to stop only when a call is registered for the dispatching floor. These approaches have been accepted although they involve undesirable waste of elevator time and travel since it has been considered that a floor beyond serving car in effect temporarily has been taken out of the primary service for which the elevator system was intended.

The present invention has as a primary object the improvement of service afforded by floor beyond serving cars.

Another object is to integrate floor beyond service in a dispatching system for elevators.

A third object is to utilize floor beyond serving elevator cars efficiently in a dispatching system.

A fourth object is to afford service to a floor or floors beyond a dispatching floor of a level comparable to that provided at floors in the dispatching direction, particularly by raising the quality of service at the floor beyond without detriment to the service to floors in the opposite direction from the dispatching floor.

A fifth object is to serve a multiplicity of floors beyond a dispatching floor.

Another object is to avoid excessive delays in the response of an elevator to floor beyond calls, particularly when an elevator has been assigned to floor beyond service.

A further object is to insure adequate service at a dispatching floor by cars returning from floor beyond service.

In one exemplary embodiment, the present invention contemplates service to a building having three floors displaced from a dispatching floor in a direction opposite the dispatching direction. These floors are basements which are subject to a substantial level of traffic of a type requiring service of a nature comparable to that afforded in the dispatching direction. Requirements of this nature are encountered in buildings having restaurants, parking garages, or entrances at levels below the main dispatching floor.

The elevator system serving this building is arranged to cause cars traveling downward toward the lower dispatching floor and encountering no call for service at that floor to proceed to the basements without stopping at the dispatching floor if basement service is required. Advantageously the determination of the stop is accomplished at the latest moment, as the car reaches the position where slowdown for the dispatching floor is initiated. This service is uniformly provided in response to calls within the car for basement service. For hall calls for basement service it is provided if no other car is conditioned to serve the call. Thus, if no other car has been assigned to serve the basement, a hall call will select the first down car meeting the requirements. Cars are admitted to basement service only as required. If the hall call is behind all basement serving cars, i.e. a down call above all descending cars, a down call while all cars are ascending or an up call below ascending cars, the hall call will effect the basement service assignment.

Cars standing at the lower dispatching floor can also be sent to the basements in response to car and hall calls under conditions similar to those discussed above. It has been observed that down hall calls are frequently registered at the lower dispatching landing when no prospective passenger seeks passage to the basements. In order to avoid unnecessary basement travel, the car assigned to serve that call closes its doors a suitable interval after the call is registered or its doors are opened whichever is later, and if no car call for a basement is registered therein by the time the doors are closed, basement assignment of that car is cancelled.

Since basement service is of major importance in a system of this nature, failure of a car assigned for basement service to operate for a given interval when basement service is required actuates controls enabling all cars to serve the basements.

Cars are arranged to farthest call reverse in the floor beyond service area to reduce unnecessary travel to a minimum.

When traveling to the dispatching terminal from a floor beyond, the cars function in a variety of ways. A car can be arranged to always stop if no car is conditioned for loading at the dispatching floor and to always pass the dispatching floor, except where a car call for that floor is registered, when a car is conditioned for loading at the dispatching floor. The passing of the dispatching floor by a car traveling in the dispatching direction can alter the dispatch interval for the car then conditioned for loading. If there are no calls registered at any point in the system, the car will stop at the dispatching floor and function in the dispatching sequence with any other cars also held at that floor.

Another mode of operating a car as it travels from a floor beyond to a dispatching floor is to condition it by virtue of its response to hall calls for travel toward the dispatching floor so that it will stop if it responds to such calls. Such a car is made to bypass the dispatching floor when it has stopped for any of those calls unless a car call is registered for the dispatching floor or a hall call in the direction of travel is reregistered at that floor.

Other conditions can be employed to dictate the operation of a car from a floor beyond as it approaches a dispatching floor. A stop can be required if the car is empty or loaded to only a certain amount. Conversely if a given degree of loading is sensed a stop can be required.

Since it is desirable to dispatch cars at intervals with some regularity, the absence of a car in condition for loading at the dispatching floor can establish a stopping circuit for a car traveling to the dispatching floor from a floor beyond. A car stopped at the dispatching floor from a floor beyond can be conditioned for loading at that floor and made subject to dispatching.

The above and additional objects and features of this invention will be appreciated more fully from the following detailed description when read with reference to the accompanying drawings in which:

FIG. I schematically represents a four-car group of elevators adapted for the incorporation of this invention and serving a plurality of floors below a lower dispatching floor;

FIG. II is an across-the-line diagram of car call, car stopping, and basement service relays typical of those individual to each car serving the floors below the lower dispatching floor;

FIG. III is an across-the-line diagram of the landing signal relay circuits common to all cars of the group and a typical landing signal reset circuit;

FIG. IV is an across-the-line diagram of the landing signal stopping circuits typical of those for each car;

FIG. V is an across-the-line diagram of the common circuits which enable certain basements to be selectively rejected by certain cars in the group;

FIG. VI is an across-the-line diagram of the common basement call behind and basement lockout circuits showing a typical individual car call behind circuit;

FIG. VII is an across-the-line diagram of car start circuits, car button reset circuits, direction throwover circuits, a gate time circuit and a portion of a retiring cam circuit;

FIG. VIII is an across-the-line diagram of a car button circuit;

FIG. IX is a block diagram of door control circuits individual to the car;

FIG. X is an across-the-line diagram of the low call reversal, door locking, and basement holding release circuits of each car;

FIG. XI is an across-the-line diagram of the common car selection circuits;

FIG. XII is an across-the-line diagram of portions of a dispatch timer; and

FIG. XIII is an across-the-line diagram of fragments of alternative car call stopping, basement service, basement run, and stop monitoring circuits individual to the cars.

FIG. I represents a bank of four cars, A, B, C and D. Throughout the specification and drawings, those elements individual to the cars have been identified therewith by the suffix letter designating the car enclosed in parenthesis. Thus, relay CUN(D) is the lower terminal or main floor selection relay for car D and contacts similarly designated are the contacts of that relay for that car. The illustrated system can be considered to constitute three basements or floors below the main floor A, B and C, a first floor above the A basement which will be considered the main floor or lower dispatching terminal 1, a top floor T which can be the upper dispatching terminal or merely the limit of travel if no dispatching downward is provided, and a plurality of intermediate floors 2, 3, 4, 5, 6, 7 and 8. It will be understood, of course, that the invention is applicable to a bank of elevators containing any number of cars and serving any number of floors. The elements individually associated with car A include a car 11 suspended by hoisting cables 12 trained over a traction sheave 13 driven by a lifting motor 14 which may be of any convenient type but ordinarily is arranged for variable voltage control as in the well-known Ward-Leonard type system. Coupled to the opposite end of the lifting cable 12 is a counterweight 15. A floor selector 16 is associated with the car to establish appropriate circuits for the car position at any instant. This floor selector can be of the commutating type, including a two-coordinate system of contacts on a panel where contacts for given functions are oriented in vertical lanes and the several contacts of the circuits performing different functions for each floor are generally aligned in rows transverse of those lanes. A crosshead (not shown) sustaining a number of commutating brushes is mounted to be carried along the contacts in a path parallel to the lanes either in synchronism with the car or suitably in advance of the running car and in synchronism with the stopped car, depending on the nature of the selecting machine and controls. While the contacts of the floor selector illustrated in the circuits to be described are mechanically commutated by a crosshead which is advanced with respect to the car while the car is running, it is to be appreciated that controls employing other forms of mechanical commutators well known to the art can be adapted to this invention and that other forms of selector devices, such as relay type selectors also lend themselves to utilization of the features of this invention.

Each of the cars A through D have individual controls including the floor selectors 16(A) through 16(D) and supplemental equipment apart from those floor selectors. All of these car controls are integrated into a system insuring an interrelated operation of the cars by means of a group supervisory control schematically represented by the rectangle 17 interlinked to the floor selectors schematically by the cable 18. The group supervisory control 17 can include means for establishing various programs of operation in accordance with manual selecting devices, clock control devices or means sensing conditions in the elevator system. It also can include dispatch timers or devices which dispatch cars on other than a time basis for certain aspects of this invention and means for generally controlling the operating pattern of individual cars and the group even to the extent of removing cars from service or introducing cars into service.

The invention will be considered as applied to an automatic elevator system wherein no attendants are required on the cars and the passengers direct car operation by indicating their demands for service from hall call registering means 19 located at each of the several floors and including down hall call means at the top through the B basement and up hall call registering means at the C basement through the floor adjacent the top floor or the eighth floor in the example. These call registering means can be common to all cars in the bank and are schematically represented as inter-connected to the several cars through the group supervisory control rectangle 17 by means of cabling 20. Passengers within the cars indicate their desired destinations by the registration of calls upon call registering means therein (not shown) which can be individual to the several floors served by the cars.

In order to facilitate an understanding of the circuits illustrated in FIGS. II through XIII, an alphabetical listing of the symbols for the relays and contacts utilized is presented below, together with a short description of those relays and the location, if shown, of their actuating coils. These relays and all other circuit elements are shown in across-the-line diagrams. The relay contacts therefore are often located remote from their actuating coils. In order to correlate the location of the actuating coils and contacts, a marginal key has been employed with each of the circuit diagrams. With this key, each diagram has been divided into horizontal bands which are identified with line numbers in the right hand margin. Relay symbols are located in the margin to the right of the line numerals and in horizontal alignment with the coil positions. The location of each contact actuated by a relay coil is set forth to the right of the relay symbol in the key by the numeral of the line upon which it appears. The numerals designating the location of back contacts, those which are normally closed when the relay is de-energized and are open when it is energized, are underlined in the key to distinguish them from front contacts, those which are closed upon their actuating coil being energized. Thus, the lower terminal selection relay actuating coil for a car A, CUN(A), appearing on line 304 of FIG. XI, has back contacts at lines 102 and 106 of FIG. II, another back contact at line 299 of FIG. XI and front contacts at lines 121, 154, 191 and 291 of FIGS. II, IV, V, and XI respectively as signified by the numerals in the margin of FIG. XI at line 304. The relay and switch symbols illustrated are as follows:

| Symbol | Name | Coil Location |
|---|---|---|
| AA | Acceleration Relay | |
| AMF | Above Main Floor Relay | |
| AMR | Advance Motor Relay | |
| AUC | Basement A landing signal relay | 185 |
| AX | A landing signal reset relay | 179 |
| A1 to A4 | Basement A signal reject relay—cars A to D | 181 to 184 |
| A1A to A1D | Basement A reject by car—cars A to D | 187 to 190 |
| BHR(A) to (D) | Basement hold release | 281 |
| BK2 | Brake relay | |
| BP | By-pass relay | |
| BR | Basement Trip Relay | 118 or 344 |
| BRX | Auxiliary Basement Trip Relay | 117 |
| BS | Basement Service Relay | 121 or 341 |
| BSD | Basement Call Behind Relay | 203 |
| BSM | Auxiliary Basement Service Relay | 126 |
| BST | Basement Service Time Relay | 102 |
| BSTA | Auxiliary Basement Service Time Relay | 101 |
| BSX | Auxiliary Basement Time Relay | 128 |
| BS1 | Auxiliary Basement Time Relay | 123 or 343 |
| BS3 | Auxiliary Basement Time Relay | 129 |
| BU | Basement Service Lockout Relay | 208 |
| BUA | Basement Hall Call Relay | 205 |
| BUB | Basement Selection Run Relay | 214 |
| BUC | Basement B landing signal relay | |
| BUT | Basement Lockout Release Time Relay | 207 |
| BUX | Auxiliary Basement Service Lockout Relay | 206 |
| BX | B landing signal reset relay | |
| B1 to B4 | Basement B signal reject relay—cars A to D | |
| B1A to B1D | Basement B reject by car—cars A to D | |
| CA(A) to (D) | Car Available Relay—cars A to D | 303 to 312 |
| CB | Car Call Above Relay | 106 |
| CBA | Auxiliary Car Call Above Relay | 107 |
| CBD | Car Call Below Relay | 116 |
| CL1 | Door Close Relay | |
| CUC | Basement C landing signal relay | |
| CUD | Up Dispatch Relay | |
| CUL | Up Load Relay | |
| CULX | Load Car Control Relay | |
| CUN | Lower Terminal Car Selection Relay | 304 |
| CX | C landing signal reset relay | |
| C1 to C4 | Basement C signal reject relay—cars A to D | |
| C1A to C1D | Basement C reject by car—cars A to D | |
| DCL | Door close limit relay | |
| DF | Down generator field relay | |
| DL | Down direction control relay | |
| F | Failure Relay | |
| G | Gate Relay | |
| GS | Group Service Relay | |
| GT | Gate Time Relay | 229 |
| HCR | High Call Reverse Relay | |
| H3 | Down Peak Program Relay | |
| J3 | Dispatch Time Relay | |
| J3A | Auxiliary Dispatch Time Relay | 321 |
| LA | Leveling Acceleration | |
| LCB | Low Call Behind Relay | 274 |
| LCR | Low Call Reverse Relay | 273 |
| LBP | Load By-pass Relay | |
| M | Main Switch | |
| MDO | Main Floor Door Reopen Relay | 155 |
| MG | Main Floor Relay | |
| MGX | Auxiliary Main Floor Relay | |
| PDO | Door Opening Prevention Relay | 278 |
| RB | Car Button Reset Relay | 225 |
| RC | Retiring Cam | 229 |
| RH3 | Rheostat Relay | |
| RL | Direction Throwover Relay | 225 |
| RSU | Lower Terminal Rotary Dispatch Selector | 299 |
| RT | Reselection Time Relay | 191 |
| RU | Lower Terminal Selection Control Relay | 291 |
| S | Stopping Relay | 153 |
| SAD to S2D | Down Hall Call Relays | 131 to 137 |
| SADA(A) to (D) | Auxiliary A Basement Down Hall Call Relays | 172 to 178 |
| SAU to S2U | Up Hall Call Relays | 139 to 147 |
| SAUA(A) to (D) | Auxiliary A Basement Up Hall Call Relays | 171 to 177 |
| SBDA(A) to (D) | Auxiliary B Basement Down Hall Call Relays | |
| SBUA(A) to (D) | Auxiliary B Basement Up Hall Call Relays | |
| SC | Car Call Stopping Relay | 105 or 333 |
| SCUA(A) to (D) | Auxiliary C Basement Up Hall Call Relays | |

| Symbol | Name | Coil Location |
|---|---|---|
| SS | Landing Call Indication Relay | |
| SU | Lowest Call Relay | 157 |
| TO | Attendant Throwover Relay | |
| TR | Standing Time Relay | |
| TSX | Dispatch Interval Abbreviation Relay | 322 |
| UBS | Up Basement Stop Relay | 336 |
| UF | Up generator field relay | |
| UL | Up direction control relay | |
| VR | Stopping Sequence Relay | |

As set forth in the description of the drawings, many of the diagrams are for elements individual to the cars. Where such elements cooperate with circuits common to the group, the combination has been considered with respect to the individual car A equipment. Thus in FIG. II a BSTA relay is shown without signifying the car to which it applies. In the contact index to the right of the diagram, line locations for the contacts correspond to those for car A in FIGS. V and X at 191 and 304 of the common diagrams.

Many of the diagrams are fragmentary and show only the new portions of the circuits or those portions considered helpful in appreciating the interrelation of elements. One example of a more complete disclosure of an elevator system to which this invention might be applied is found in R. A. Burgy patent application Serial No. 808,290 for "Elevator Controls" filed March 30, 1959. The invention disclosed here is particularly well suited to supplement that system although this invention is not to be understood as restricted in application only to that type of system.

The exemplary system includes a dispatching floor having three floors beyond in the direction opposite that in which cars are ordinarily dispatched. The dispatching floor is at the lower portion of the structure so that cars are dispatched upward therefrom and the floors beyond are below. While the detailed description of the system refers to basements as the floors beyond it is to be recognized that a system in which there are floors above a dispatching floor from which cars are sent downward might also embody many of the features of this invention and that basements are employed only for convenience in illustrating the invention.

In this system the hall and car calls at the floors above the main floor are of conventional form and the cars respond thereto in the usual manner. Calls for basement service are registered by hall or car calls for the basements and by down hall calls for the first floor. The system assigns cars for travel to the basement when car calls are registered therein for basement service, and, when a car is available, in response to hall calls provided the car is situated to most conveniently serve the calls and no other car is assigned to serve the basement or if assigned is incapable of serving the call. These functions are provided by a basement service relay BS which is responsive to the condition of the car and its relationship to the service demands and a basement service lockout relay BU which restricts the admission of cars to basement service in response to calls common to the cars, hall calls, to avoid excessive basement travel. Before considering relays BS and BU the call registering circuits will be described.

The registration of either a hall call or a car call for service to one of the basements is effective in the circuits of lines 117 through 129 and controls car operation through the car call stopping circuits fragmentarily illustrated from line 104 through line 115. Car call stopping relay SC at line 105 institutes the stopping sequence for the car in response to car calls throughout the range of car travel by the engagement of one of the family of contacts 51 of a suitable commutating floor selector machine 16 by brush 52 of that machine. As the car descends, the brush 52 engages first floor contact 1 of the family 51. If the car button for the first floor C1 has been closed at 107, relay SC is energized across lines P and Y supplied by a suitable alternating current source. Relay SC then initiates the stopping of the car for that car call in a well-known manner. This type of stopping circuit is available at all but the floors at the limits of travel where the contacts 51 are connected directly to the main lead as at line 106 for top floor contact T and at 110 for basement C.

At the main floor the car stopping circuit is completed, in the absence of a call if no call for basement service exists, through the down generator field relay contact DF and the basement service relay back contact BS at 109 provided the car is in group service so that its group service relay contact GS is closed at 108. Thus, if a basement call is registered to open back contact BS at 109, a call is registered for the car below the main floor, and no car call for the main floor is registered by contact C1 at 107, the car will pass the floor unless a down hall call is registered at the main floor.

The hall call stopping and reset circuits individual to a car and the relays common to all cars in the bank are shown in FIGS. III and IV. Contact families of the down reset 53, the up reset 54, the down stop 55, and the up stop 56 are shown fragmentarily. Pressure on any up hall button, as UH1 for the main floor, or down hall button, as DH1 for the main floor, energizes a corresponding hall call registering relay S1U at 141 or S1D at 133 respectively. Stopping circuits are thereby partially completed through the closure of contacts S1U at 152 or S1D at 160 respectively to actuate the appropriate floor selector contact of the 56 or 55 family. In the case of a down hall call at the main landing, the contact 55 at 160 is activated when the car is descending so that hall call stopping relay S is energized through contact DF at 154 of down generator field relay as brush 57 engages the contact. Stopping relay S functions in a manner paralleling that of relay SC to initiate the car stopping sequence. It is effective during the ascent of a car through an up generator field relay contact UF at 153 when brush 58 encounters an active contact 56. The contacts LBP, VR, HR3 and BP in circuit with relay S at 153 are ordinarily closed while the car is running, load by-pass contact LBP being opened only when greater than a predetermined load is in the car, contacts VR and RH3 opening only during the stopping sequence, and contact BP being opened only when a by-pass of the car has been instituted.

The landing signal relays of FIG. III are of the magnetic latch type. They have a reset coil wound to generate a flux in opposition to the magnetic field which holds them pulled in. This winding is energized while brush 59 engages the floor selector contacts 53 for the floor having a call registered as the stopping sequence is initiated and contact VR at 133 closes to effect a down landing signal reset at the floor through down direction control relay contact DL at 132, closed by-pass relay contact BP at 132 and stopping sequence relay contact VR at 133. Door close limit relay contact DCL at 132 maintains the reset while the car is stopped and until its doors approach the fully closed position. Similarly, an ascending car resets up hall calls through up direction control relay contact UL at 140 when its brush 60 is in engagement with the contact 54 for that floor and the slowdown of the car has been initiated.

Requirements for travel to one or more of the basements are indicated by hall calls and car calls for those floors. The present system has been refined to include means for restricting any car from serving any of the basements. Typical individual car basement lockout circuits are shown in FIG. V from lines 187 through 190 for the A basement. Contacts AA, AB, AC and AD are closed by restricted control means such as key operated switches or switches within a locked control box to exclude cars A, B, C and D respectively from basement A.

The closing of these switches pull in basement reject relays A1A, A1B, A1C and A1D to prevent cars A, B, C and D respectively from serving basement A. Similar circuits (not shown) for the other basements are provided to include basement reject relays B1A, B1B, B1C, and B1D for barring service by cars at basement B and basement reject relays C1A, C1B, C1C and C1D for barring service by cars at basement C.

The basement reject relays in turn control signal reject relays individual to the car as are shown from lines 181 through 184. When an up or down hall call for basement A is registered, one of these relays individual to each car is energized unless the car is excluded from serving that basement. Thus, if car B is excluded from serving basement A by closure of contact AB at 188 to energize A1B from the leads Gn and Br supplied from an alternating current source, contact A1B at 182 is open and the A basement signal reject relay A2 for car B is barred from energization when either an SAU contact at 182 or an SAD contact at 185 is closed. Assuming cars A, C and D can serve landing A, a landing signal for the A basement pulls in each of their signal reject relays A1, A3 and A4 respectively.

The capacity for at least one car to serve landing A is indicated by landing signal reset relay AX at 179 which remains dropped out as long as that condition prevails due to the open back contact A1, A2, A3 or A4 of the operated landing signal reject relay of the operative car. The presence of either an up or a down landing signal for the A landing is indicated by energization of relay AUC at 185.

The coincidence of a landing call and the capability of the car to serve that call is signified by auxiliary landing signal direction relays individual to the cars shown in a family grouping at lines 171 through 178 for landing A. An up hall call at the A basement closes contact SAU at 173 to complete the circuit to lead 62. Those cars capable of responding to such a call have their A relays energized and accordingly have a complete circuit to the individual car auxiliary up landing signal relays. In the case of car A, with contact A1 closed at 171 car A up landing signal relay SAUA(A) at 171 is energized. In the same manner a down hall call will close contact SAD at 178 to lead 63 and energize car A down landing signal relay SADA(A) at 172 through closed contact A1 at 172. In the situation assumed above where cars C and D can also serve basement A an up hall call will also energize SAUA(C) and SAUA(D) while a down hall call will pull in SADA(C) and SADA(D). Circuits (not shown) including individual car landing signal relays for basement B and basement C are also provided.

A descending car for which no basement calls are registered will stop at the main floor when brush 52 engages the main floor contact 51 since a circuit is completed through closed contacts GS, BS and DF at 109. If a call is registered requiring the car to travel to the basements its BS relay is energized and back contact BS at 109 is open to break this stopping circuit. Relay BS can be energized by either car or hall calls.

As the floor selector crosshead of the car descends below the second floor position, above main floor relay AMF (not shown) drops out to close back contact AMF at 113. Car calls registered for a floor above the car are ineffective while it descends since down direction relay back contact DL at 106 is open hence the car call above relays CB and CBA are not energized at this time and back contact CB at 122 is closed. This contact is ineffective except while the car is at the first floor since back contact MG at 123 is closed. Since the car has not entered the dispatching sequence, it cannot be dispatched and up dispatch relay CUD is not energized. Back contact CUD at 122 is closed. Relay BS can be closed at this time by completing a circuit between leads 64 and 65.

A car call for a basement will complete the circuit between leads 64 and 65 when a call is below the car, provided the car is not in the up load status, through closed back contact CUL and front contact CBD at 123. Relay CBD at 116 is energized by a car call below the car if the car is not barred from serving that floor. The energizing circuit extends from lead P through car call above relay back contact CB at 116, up direction control relay back contact UL at 116 (which is closed while a car is descending), or main floor relay contact MG at 115 if the floor selector crosshead of the car is at the main floor, through the closed back contacts 71 and the closed car button contacts to lead Y. Contacts 71 are opened by a cam 72 on the floor selector crosshead as the crosshead advances so that those contacts for the floor position of the crosshead and the floor above that position are opened in contact family 71 while those contacts for the floor position of the crosshead and the floor below are opened in contact family 73 by a cam 74. In FIG. II the cams 72 and 74 and brush 52 are represented for the crosshead when positioned at the A basement. Closure of basement car button CCA, CCB or CCC energizes CBD if the car is above those floors, is not barred from service to the called floor and the other conditions are met.

Car call registration for a barred floor is prevented by opening a back contact of that car's basement reject relay for that basement. As illustrated at 113, 114 and 115 these contacts for car A are A1A for A basement, B1A for B basement and C1A for C basement. The holding coils for the car call circuits are also rendered ineffective for those floors which are not to be served by that car at back contacts A1A, B1A and C1A in lines 250, 252 and 254 respectively so that the closure of a button actuated contact has no effect on car stopping circuits, call position indicating circuits, or call holding circuits.

A hall call for a basement can complete a circuit through back contact BU at 120 between leads 64 and 65 to energize BS relay. A hall call for the basements also drops out relay BUX at 205 to close back contacts BUX at 119. A descending car will complete the BS energizing circuit between lead 64 and 65 through contacts BUX at 119, BU at 120, down generator field relay contacts DF at 120, stopping sequence relay back contacts VR at 120 and the basement signal reject relay contact A1, B1 or C1 for the basement having the call. Relay BS is sealed in once it is energized through contact BS at 119 which with contact BUX maintains the circuit if the car is stopped and contact VR at 120 opens. A down first floor hall call will drop out BUX and BU while closing contact S1D at 119 so that a descending car completes the circuit through BUX, BU, DF, VR and S1D. The seal circuit for BS is through contact BS at 119; however, when the descending car begins to stop for the hall call at the first floor that call is cancelled so that BU and BUX are reenergized. At this time main floor relay contact MG at 120 is open and no seal circuit can be maintained at 119 and 120.

A second seal circuit for BS when subject to a S1D call is established by relay BSM at 126 which is pulled in when the crosshead of the floor selector actuates main floor relay MG and closes contact MG at 127. The descending car has relay DF energized at this time so that the circuit is complete through contacts MG and BS at 127 and contact DF at 126. BSM seals itself in by closing contact BSM at 127 so that the opening of contact DF at 126 has no effect. Its BS sealing contact between leads 64 and 65 appears at 122.

When a car arrives at the lower terminal, it is set for travel upward if it is not to be introduced into dispatching. At such time it is precluded from advancement into basement service by a hall call except through its selection by operation of its lower terminal selection relay CUN to close contact CUN at 121. A hall call for a basement if effective to drop out relay BU will energize BS by completing the circuit between leads 64 and 65 through contacts BUX, BU, CUN and any of S1D, A1, B1 or C1. The seal circuit for a call at a basement is at 119 through contacts BUX and BS. A down call at the main landing is cancelled when the car direction is thrown over for down travel to open BUX at 119. A seal circuit is afforded at 125 through main floor relay contact MG, contact BS and gate relay back contact G.

Registration of a main floor down hall call or a basement hall call is effective to open contacts in the circuits energizing basement service lockout relays BU and BUX at lines 208 and 206 respectively. Relay BU while energized prevents the assignment of a car to serve the basements in response to hall calls requiring basement service by holding back contact BU at 120 open. The registration of any hall call for basement service will drop out BU in the absence of a car conditioned to serve that call by opening a back contact in line 208. If a car is in basement service and capable of serving the basement hall call, relay BU is maintained energized to lock out other cars despite the opening of the circuit at 208. The presence of a car in basement service is indicated by completion of one or more of the parallel individual car circuits in lines 209 through 216 to hold BU in even though a call is registered. These circuits are effective if the basement car is descending so that its DL contact is closed or is below the new basement hall call if it is an up call to maintain contact LCB closed, is above the new basement hall call if it is a down call, indicated by a closed BSD contact, is not barred from serving any basement for which a hall call is registered as indicated by its energized BHR relay and closed BHR contact, and is conditioned for basement service by having its BS3 contacts closed. These circuits become ineffective to energize BU when no car has begun to respond to a basement call for a given interval and basement lockout release timer BUT opens its back contact at 209.

Timer BUT is responsive to the start of any car conditioned to serve the basement call. Therefore it can be set with a relatively short interval since a normal stop will not cause the interval to expire yet it will rapidly clear the trouble by admitting other cars to basement service if the car fails.

A down hall call at the main landing opens back contact S1D at 208. Once a call of this nature has instituted assignment of a car to basement service by dropping BU out, it is desirable to reenergize BU because so long as BU remains deenergized cars which are selected at the main terminal by having their CUN relays energized will continue to be advanced into a basement service status. The assignment of a car to basement service therefore pulls in BS3 at 129 following the energization of BS1 by closing of contact BS at 123 to close its contact BS1 at 129 provided the car has its failure relay F back contact closed and is in group service so that contact GS is closed. While that car remains at the main floor, its MG contact at 209, in the case of car A, remains closed to complete a circuit around S1D and maintain relay BU energized. Once the car has started from the main floor to serve the basements, contact MG opens. At that time another down hall call upon opening S1D, will be effective to drop out BU and advance another car into basement service status.

Basement service lockout by energization of BU is prevented by a basement call behind circuit for the basement landings by relay BSD at 203. When the car has no down basement hall calls above, as when it is at the B basement and its brush 66 engages contact B of the basement call behind family of floor selector contacts 67, back contact SAD at 203 is closed and relay BSD is energized from lead Gn through lead 68, contact SAD, contact B-67, brush 66, coil BSD and lead Br. This closes contact BSD for that car in the BU energizing circuits to assure that lockout of basement service will not be disabled by the BSD circuit in the absence of down calls behind. Conversely a down call behind a car will open the energizing circuit for BSD of that car and will open the basement lockout by that car.

Up basement calls below a down basement serving car or above the car are ineffective to disable the basement service lockout. On the other hand, up calls below an up traveling car will not afford an energizing path for BU and thus will disable the lockout. Contact LCB provides these features. While a car is conditioned for descending contact LCB is ineffective since the car's DL contact in parallel therewith is closed. Once a car has been conditioned for ascent contact DL opens and contact LCB becomes effective. In the absence of calls, low call behind relay LCB at 274 of FIG. X will be energized. Any basement call below the car which the car is capable of serving will drop out relay LCB and open contact LCB in the energizing circuit of relay BU. Relay LCB is energized through a series of back contacts for the auxiliary basement hall call relays SCUA through SADA from which lead taps to a low call behind family of floor selector contacts 69 which are engaged in accordance with the effective position of the car by floor selector brush 70. Brush 70 is connected through a by-pass relay contact BP to the low call behind relay LCB at 274 and a low call reversal circuit at 273.

Continuity of the pull in of relays LCB and BSD while a car travels between basement floors and while the brushes 66 and 69 move between contacts 67 and 68 for those floors is desirable. This is attained by arranging the relays to delay their dropout for an interval longer than the transfer time of the brushes between contacts and by employing long brushes which span at least a major portion of the space between those brushes.

Basement holding release contacts BHR are controlled by relays individual to the car which sense the capacity of the car to serve hall calls at the basements. Thus when a car is barred from service to a particular basement by its basement signal reject relays A1, B1 or C1 being held inoperative the corresponding contacts at 281 remain open despite the registration of a hall call for the corresponding basement. However, the registration of such a call energizes a basement call relay AUC, BUC (not shown) or CUC (not shown) for basement A, B or C respectively to open back contacts at 280 in the BHR circuits for each car. If car A were locked out of service to basement A, an up hall call or a down hall call for that basement closing SAU or SAD at 182 or 185 would be ineffective on relay A1 at 181 although it would energize relay AUC at 185. As a result contact A1 at 281 would remain open and back contact AUC at 280 in parallel therewith would be opened to deenergize relay BHR and open its contact at 209. Basement service assignment of another car then could not be prevented by car A even though it was serving a basement since a call was registered at a landing which it was barred from serving.

Failure of a car conditioned for basement service and capable of serving the current basement service demand to respond within a given interval releases the basement service lockout by deenergizing relay BU whereby cars are assigned to basement service as they become available for such service until a car does respond. In the present instance response is measured by the initiation of car operation, signified by operation of a rheostat relay RH3 in the motor control circuit to close its contact in the circuit of the conditioned car at lines 210 to 216 and energize basement selection run relay BUB at 214. In the case of car A, assume it is set for down travel to close contact DL(A), has no down basement hall call above it to open contact BSD(A), is capable of serving all registered basement hall calls so that BHR(A) is closed, and is assigned to basement service to close BS3(A). At each stop of car A contact RH3(A) at line 210 opens. If no other car is in basement service to complete its circuit corresponding to that outlined above, relay BUB drops out and closes its back contact BUB at line 207. When car A or another basement car which can serve the calls registered starts it closes its RH3 contact and BUB is pulled in.

Relay BUB functions in the control of a basement lockout release timer BUT at 207 of the slow pull-in type. That timer is also subject to a basement hall call relay BUA at 205 which drops out if any of the back contacts S1D through SCU are opened by registration of a hall call for basement service. Upon the coincidence of closure of back contacts BUA and BUB at 207, BUT begins to time out. When the time out interval, which may be about 20 seconds, expires, timer BUT opens its contact at 209 and since a hall call for a basement is in registration to open the circuit at 208 relay BU is dropped out. Thus the BS relays of all cars are ultimately energized by one of the means discussed above and those cars are assigned to basement service. Once a car is conditioned to complete a circuit from lead Gn through its RH3 contact and relay BUB to lead Br the timer is reset and the system returns to normal operation with basement lockout relay BU effective.

When a call is registered which requires the car to stop at the main landing, that car is introduced into the car selection sequence at that landing. This sequence selects cars in their order of arrival where only limited numbers are present and, when they accumulate, in a predetermined order. While selected, the cars can be advanced into either a basement service status or into the up load status of the dispatching sequence. Since only one car is selected at a time and individual cars can be barred from serving individual basement landings, selection of each car is for a limited time so that if the car is not advanced into up load status, as where another car fills that status, and is not placed in basement service, as where a basement call is registered which cannot be served by that car, the car will be released from selection and another car, if available, will be selected. This reselection affords an opportunity for a car to be selected which is capable of serving the floor for which the call is registered.

The dispatching functions performed at the main floor can follow several patterns when combined with the present system of basement service. For convenience the system will be described as utilized in the dispatching scheme of the aforenoted R. A. Burgy application, Serial No. 808,290 for "Elevator Controls." In that system cars upon stopping at a main terminal were made available for selection. As vacancies occurred in the up load status as by dispatching the car in that status the car conditioned for loading by passengers desiring travel upward, a selected car is advanced to that status leaving a vacancy in the selection so that another car can be selected. Alternatively, a car can be introduced into basement service in response to a basement service demand to create a vacancy in the selection.

The system with which the present invention is illustrated differs from that of the aforenoted application in that a selected car can also lose its selected status upon the expiration of an interval. The lower dispatching floor car selection circuits are shown in FIG. XI together with certain of the auxiliaries to that selection. As in the aforenoted application the arrival of a car, car A for example, at the main floor closes its MG contact at 304 to energize the car available relay CA at 303 from a suitable alternating current source through lead Gn closed contacts BSTA, MG, CUL and BR at 304, coil CA and lead Br. At this time basement service time auxiliary relay BSTA at 101 is energized, up load dispatch relay CUL (not shown) is deenergized and basement run relay BR at 118 is deenergized. Relay CA(A) pulls in its contact at 299. If no car is selected at the main terminal, all of the CUN relays are deenergized and lower terminal car selection control relay RU at 291 is deenergized so that its back contacts at 299 and 300 are closed. Lower terminal car selection is initiated by the rotary selector switch RSU at 299 through the closed CA(A), CUN(A) and RU contacts at 299. RSU hunts for the available car by closing in sequence the RSU contacts at 304, 307, 310 and 313. When RSU at 304 is closed, car A is selected by energizing relay CUN(A) at 304. This terminates the hunting by RSU since it opens back contact CUN(A) at 299 and energizes RU through closed contact CUN(A) at 291 to open back contacts RU at 299 and 300.

A short interval after a car is selected, its basement service timer BST at 102 times out due to the opening of back contact CUN at 102. Contact BST at 101 opens to deenergize auxiliary basement service timer BSTA at 101. If the car has not been conditioned for basement service by the closure of contact BS3(A) at line 306 the opening of BSTA(A) at 304 has no effect. If it has been conditioned for basement service by a car or hall call, contact BS3(A) at 306 is open and the car relinquishes selection to enter basement service.

Assume for the moment that the car is not introduced into basement service and that another car is in up load status so that car A retains selection. If a call were registered for a basement which car A was incapable of serving, by reason of the basement reject circuits for example, service to that call would be unduly delayed if the car maintained its selected status and another car capable of serving that call was available at the lower dispatching terminal. Accordingly, the car is released from selection after an interval.

Selection release is effected by a reset timer RT at 191 of FIG. V which causes RSU to hunt for another available car. As CUN(A) was energized it closed contact CUN(A) at 191 to complete a circuit with the closed contact BSTA(A) at 191 for energizing RT. After the interval for assignment to basement service, measured by BST, has expired, contact BSTA(A) at 191 opens to deenergize and initiate the dropout interval of RT. Contact BSTA(A) at 291 opened with the dropout of BSTA(A) so that relay RU is held energized through contact CUN(A) at 291 and contact RT at 292. When RT drops out, conveniently about 1.5 seconds after BSTA, RU is deenergized and permits its back contacts at 299 and 300 to close. If another car is available so that its CA relay is energized and its CA contact at 300, 301 or 302 is closed, RSU is again energized despite the presence of a car in selection. RSU therefore opens its contact for the selected car as it is first energized and in succession closes and reopens its contacts for the other cars until it closes an RSU contact of an available car. At that time the selection relay CUN of that car is pulled in to deenergize RSU by opening its contact in series with the closed CA contact. The circuits originally established by selection of car A are no longer available since the CUN(A) contacts at 102, 191, and 291 all opened as RSU opened its contact at 304. If the next selected car can serve the basement call, its BS relay is energized and basement service assignment completed; If the up load status is vacant while that car is selected, it is advanced to that status; and if neither or these conditions occur the reselection cycle continues to repeat so long as another car is available.

In some circumstances continuation of reselection may be undesirable. An alternative circuit which can be made effective by closure of switch 75 at 195 is shown in FIG. V. That circuit prevents the reselection sequence by maintaining relay RT energized if no hall call is registered to drop out landing call indication relay SS (not shown) so its contact SS at 195 remains closed and if basement lockout is effective to energize basement service lockout relay at 208 and close its contact BU at 195.

When once energized, basement service relay BS remains energized until the car completes its service to the basement. Relay BS completes a seal circuit through contact BS at 119 which is effective after the car departs from the main floor and drops its MG relay to close back contact MG at 120. This is necessary since the drop of MG opens contact MG at 127 to drop BSM and open its contact BSM at 122. BS can be dropped out when the car runs above the main floor and opens contact AMF at 118 or when a car call is registered above the car to open back contact CB at 122.

Relay BS in addition to opening the car stopping circuit at 109, establishing seal circuits at 119 and 127, and pulling in auxiliary BS1 at 123 performs a number of other functions including its own reset without starting the car in the case a first down hall call causes its energization and the doors close before a basement car call is registered at 125 and 222, and the prevention of direction throwover and car button reset of a car descending to the main floor at 223 and 248.

If a car arrived at the main floor with BS energized, back contact BS at 223 is open and engagement of floor selector contact 76 in the direction throwover relay RL and car button reset relay RB circuit is opened so that no reversal occurs. If that car is required to stop by a car call, a suitable interval after the stop the car doors are closed by known means (not shown), the car gate relay G (not shown) is energized by the closure of the doors to open back contact G at 229 and gate time relay GT drops out a short time thereafter to close back contact GT at 222. Since contact BS at 222 is closed, an energizing path is completed for the car start circuits and the car proceeds to the basements. Similarly, if the car is stopped by a first down hall call and a car call for a basement or a basement hall call is registered to energize relay BS the car start circuit is completed.

Prospective passengers, through a lack of appreciation of the elevator system functions, often register a first down hall call in the belief this will call a car to the first floor, even though they wish to travel upward. When the car is effectively at the first floor, so that contact DF at 126 is open to prevent the establishment of a BS seal circuit through contact BSM at 122, such calls do not require the car to travel to the basements according to this invention. Instead the car closes its doors and if no car call or basement hall call requires its service to the basements at that time it resets the basement service assignment of the car by dropping out relay BS. With BS energized the car will either retain or reset itself to the down travel setting thereby cancelling the down first hall call S1D.

In some instances it is advantageous to close the doors of cars parked at the dispatching floor. This is often done at night in the manner described in the aforenoted application, Serial No. 808,290. As set forth in that application hall calls for basement service are answered by the selected car, that car having its CUN relay energized. A down hall call at the main floor requires the car to open its doors. A suitable interval thereafter the doors should close provided no obstruction is in their closing path. Any basement assignment response to a main floor down hall call should be self cancelling without causing the car to start to avoid basement travel due to incorrectly registered calls. Such cancellation can be employed where an alternate basement assignment holding circuit is established for correctly registered calls. If the prospective passenger who registered the down hall call at the main floor desired travel to a basement, he would enter the car and register a car call for the basement. The assignment circuits are arranged to seal in when a basement car call is registered so that the floor call cancellation is ineffective under these circumstances and the car runs to the basement. The basement assignment cancellation for a main floor down hall call should occur only after the opportunity for loading the car conveniently, when the car operating has been cleared and a car operation has been initiated. In the present illustration the closing of the entryway to the car has been employed as the measuring point by initiating the cancellation functions as the car gate relay is energized. However, alternative factors can readily be substituted as the initiation of the closing operation, operation of an intermediate car gate or hatchway door limit or the like.

A main floor down hall call closes contact S1D at 160 to energize main floor door reopen relay MDO at 155 for the selected car at the main floor through contact CUN at 156. MDO has three functions, on off hours or night service the car may be shut down and MDO will condition the car for running by means not shown; if the car door is closed MDO will initiate its reopening by means not shown and if a delay is encountered in conditioning the car for basement service by operation of the direction throwover circuit to cancel the main floor down hall call which initiated the operation, MDO closes its contact MDO at 305 to thereby hold the car selection around the now open BS3 contact and prevent another car from being selected, from pulling in its CUN relay from operating its MDO relay and thus from opening its door and/or conditioning it for starting.

The main floor down hall call opens back contacts S1D at 205 and 208 to deenergize relays BUA and BU. Contacts BUX at 119 and BU at 120 close to energize BS through contact CUN at 121. BS closes its contact BS at 127 to energize BSX through closed contact MG at 127. As the car begins to be opened gate relay G (not shown) drops out and shortly thereafter door close limit relay DCL (not shown) is energized. Closure of gate relay back contact G at 125 completes a seal circuit for relay BS through closed main floor relay contact MG, contact BS and contact G. Closure of door close limit relay contact DCL at line 132 partially completes the reset circuit for S1D, that circuit being completed when the car direction is thrown over by operation of the basement service relays BS and BS3 to close down direction control relay contact DL at 132. Relays BU and BUX are then pulled in to open the circuit through which BS was originally energized.

After the door has stood open a suitable time interval, or if a load has entered the car, a suitable interval thereafter, minimum start time relay TR (not shown) drops out to close back contact TR at 261. Since contact BSX at 261 is also closed, a circuit is completed around those door actuating circuits which normally require the car starting circuits to be effective to cause the car and hatch doors to close. When the doors are almost completely closed the gate relay is reenergized to open back contacts G at 125 and 229. Contact G at 125 is immediately effective to open the seal circuit for relay BS. If, at this time, a car call for a basement has been registered an alternate seal of BS is provided through contacts CUL and CBD at 123 to prevent the drop out of relay BS and render the opening of contact G of no effect. Contact G at 229 on opening deenergizes slow dropout relay GT which closes its back contact GT at 222 a short time thereafter. If the basement service relay was dropped out, contact BS at 222 is open at this time and no car starting circuit is completed around the usual car start controls at 221 and the car offers no response and reverts to its original condition set for up travel. If on the other hand contact BS remained closed, as where a car call for a basement was registered, the car start circuits are energized and the car runs to the basement.

The above sequence of main floor down call cancellation without car travel to the basement also occurs if no other basement call is registered when the call was registered while the car door is not reclosed. In this instance the MDO relay functions are unnecessary and the BS relay seal circuit 125 is completed upon the pull in of BS and before the hall call is cancelled by the direction throwover operation.

Car reversal and car button reset circuits are shown in FIG. VII. They are actuated by floor selector contacts 75 at the upper limit of travel, 76 at the main landing, and 77 at the lower limit of travel or C basement when brush 78 is brought into engagement therewith. The reset and reversal ordinarily occur as the car begins to stop and the crosshead of the floor selector reaches the main landing position so that brush 78 engages contact 76 through a circuit from a direct current source (not shown), lead R, closed M-G run switch contact M at 225, car button reset coil RB, the upper coil of direction throwover relay RL at 224, closed up direction control relay back contact UL at 24, closed group service relay contact GS and closed basement selection relay contact BS at 223, selector contact 76, brush 78 and lead B. However, if the car has been selected for basement service before it is stopped at the main landing, back contact BS is open and no reversal or reset of car buttons occurs until the car runs to the C basement to engage contact 77 with brush 78 or a low call reversal occurs through contact LCR at 223.

If a car has stopped at the main floor before it is assigned to basement service by relay BS, the direction throwover and car button reset occur through contacts UL at 224, GS at 223 and BS at 223. If the car is assigned to basement service while at the main floor, relays RB and RL are reset through basement selection relay BS3 at 129. Operation of BS3 closes its contact at 227 to energize, through main floor relay contact MGX at 227, the lower coil of relay RL and relay RB, thereby setting car for travel in the down direction and energizing the car button reset.

A down traveling car below the main or lower dispatching floor reverses either at the lowest basement as described above or when it reaches the lowest call to which it can respond. The low call reversal relay LCR is shown at 273. It is operated from the series of auxiliary landing signal direction relays in the manner described for low call behind relay LCB supplemented by a contact which is closed only if no car calls are below, back contact CBD, an acceleration relay contact AA which is dropped out as the car begins to level, a down generator field contact DF which is closed only when the car is moving downward, and a stopping sequence back contact VR which opens as a stop is initiated. If when the car moves downward, brush 70 engages one of the 69 contacts which are live through closed landing signal contacts, relay LCR is energized to initiate a low call reversal. LCR closes its contact at line 223 to energize relay RB and the upper coil of relay RL through contact M at 225. This resets the direction control relays (not shown) for up travel closing contact UL at 158 to establish a stopping circuit through relay S by means of contact LCR at 158. The stopping sequence then proceeds in the usual manner and the car starts upward after the usual stopping interval at the next landing reached by the car (that corresponding to the contact which initiated the stopping sequence). FIG. VIII illustrates the car button circuits. A car call registration is retained by a solenoid 80 which holds the car button contact closed. They are arranged to be reset by opening back contact RB at 250 unless the car is at the main floor so that its MG contact at 248 is closed and basement selection contact BS at 248 is closed to complete a circuit around contact RB. This extra circuit avoids reset of car buttons when basement car calls are registered and the car is reversed for down travel while at the main landing.

On up travel the car resets the basement car calls as it begins to level at the main landing without disturbing other car calls by opening all of back contacts LA, MGX, and UF at 251 to 253 in the circuit of the holding coils 80 for landings A, B, and C. This circuit is interrupted since the car is ascending and its up generator field relay back contact UF at 253 is open, its crosshead is at the main landing to open back contact MGX at 252, and upon initiation of leveling acceleration relay back contact LA at 251 opens.

An up traveling car which stops for basement car calls will have its crosshead arrive at the first floor with those car calls registered. The circuit of FIG. II is arranged to retain basement service assignment of such a car when basement hall calls remain registered at the time it arrives at the first floor. Car calls are prevented from retaining that assignment by insuring that the car direction remain set for up travel until the car buttons for the basements have been reset. Relay CBD seals relay BS through contact CBD at 123. An ascending car cannot pull in its CBD relay until it has set its brake since up direction relay back contact UL at 116 is open and brake relay back contact BK at 115 is open. Further, the direction throwover and car button reset circuits at lines 222 to 228 cannot become operative until the car stops since back contacts UF at 227 is held open while the car is ascending. If no hall call for basement service is in registration to effect a seal of BS through contacts BUX and BS at 119 (as will be described in more detail), BS will be reset when the floor selector crosshead for the car arrives at the first floor position and opens back contact MG at 120. This occurs before the car ceases its ascent. Therefore, BS drops out to drop out BS3 and break the direction throwover circuit at 227 unless a basement hall call is registered to provide an alternate circuit.

An up traveling car can be arranged to function in any one of several ways when it arrives at the main floor according to this invention. It can stop at that floor in response to car calls and up hall calls in the conventional stopping circuits described. It can be barred from stopping for other reasons than calls on certain operating programs. It can be made to by-pass the main floor if it has car calls for floors above the main floor. It can be stopped if no car is in the up load status. It can be barred from stopping in response to a certain loading. A stop for an up basement hall call can cause it it pass the main floor. Combinations of these stop control functions can be employed to advantage and will be illustrated.

In FIG. II a car ascending from the basement is stopped by the energization of the car call stopping relay SC through brush 52 upon its engagement with the stopping contact 51 at 107 for the first or main landing. These circuits are through the group service relay contact GS at 109 which is closed when the car is in group service, the up generator field contact UF at 110 which is closed while the car travels upward, the down peak program relay back contact 113 at 111 which enables the circuit on all but the down peak, and alternate energizing paths through the car call above relay back contact CBA at 111 which is closed when no car call is above the first floor or through the combination of a by-pass relay contact BP at 110 and a load car control relay back contact CULX which is closed when no car is in the up load status. This circuit is effective to stop the ascending car on all but the down peak program if no car call is above the first floor or if the car is not by-passed and no car is in the up load status.

If a car is stopped at the main floor as it ascends from the basement and it has a car call above, it is advantageous under certain circumstances to bar it from main floor selection through its CUN relays. Basement run relays BRX and BR accomplish this. As the car ascends, up generator field relay contact UF at 117 is closed. When its crosshead reaches the main landing contact MG at 117 is closed. A car call above that landing registered before the car stops at that landing closes CB at 117 to complete a circuit which energizes relay BRX to close its contact at 118. When the car stops BRX holds itself in despite the opening of contact UF at 117 and back contact UF closes to energize relay BR at 118. Relay BR opens its back contact BR at 304 to prevent the energization of car available relay CA and main floor selection relay CUN. If the car call above the main floor is registered after the car stops at that floor this feature is ineffective and the car can be conditioned as an up load car.

An up traveling basement serving car can retain its basement service assignment upon its return to the main floor if a hall call for basement service is registered so that relay BUX at 206 is deenergized. When the car assigned to basement service leaves the main floor traveling downward, it opens the seal circuits at 122 and 125 leaving only the seal through back contact MG at 120 and contacts BS at 119. As it returns to the main floor it again pulls in its MG relay to open back contact MG at 120. If BUX is deenergized at this time it has its back contact BUX at 119 closed to maintain a seal for BS through contacts BUX and BS at 119 whereby the car is again conditioned for travel downward and proceeds to the basements.

Fragments of alternative stopping circuits are shown in FIG. XIII. Relay SC is energized at the dispatching or main floor when brush 52 engages the main landing contact 51 if a first floor car call is registered. If switches 76 and 77 are closed, the car is ascending (contact UF is closed), the car is in group service (contact GS is closed), it is loaded to less than some predetermined amount (back contact LW is closed), it is not on the down peak program (back contact H3 is closed), and either no car call is registered above the main floor (contact CBA is closed), or the car is not set to by-pass (contact BP is closed) and no car is in the up load status (contact CULX is closed), relay SC will be energized even in the absence of a first floor car call. Further alternatives can be introduced by manipulation of switches 76, 77 and 78. If switch 78 is closed the ascending car in group service will stop under all circumstances if no car is in the up load status since contact CULX at 331 will be closed. This can be the sole control of CS other than CB1 if switch 76 is closed and 77 opened. If switch 76 is opened, the car will always by-pass the main floor in the absence of a call if it stops for a call in the basement which would admit an up load to the car since contact UBS at 334 will be opened.

A stop for an up hall call or a low call reversal in the basements energizes relay UBS at 336 and seals it in until the car ascends above the main floor. Stops can be either in response to an up hall call while the car is ascending or a low call reversal when the car is descending. A stop by a car serving the basement for an up call while ascending is effective through above main floor relay back contact AMF, up generator field relay contact UF and stopping sequence relay contact VR, all at 336. A low call reversal energizes relay LCR at 273 as described and closes contact LCR at 157 to energize low call slow-down relay SU at 157 and close contact SU at 338. When UBS is energized, it seals itself by closing contact UBS at 337 until contact AMF is opened as the car ascends above the main floor.

Thus it will be seen that a car traveling upward from the basements can be expedited past the main floor by a predetermined load through contact LW at 334. If it is on the down peak program it is also expedited since contact H3 at 334 is open. The coincidence of no car call above the main floor (resulting in an open CBA contact at 334) and a car in up load status to open contact CULX at 335 will also prevent a stop in the absence of a call at the main floor. The above features can be combined or employed singly in controlling operation of relay SC. For example, the last controlling combination of factors can be eliminated by closing switch 79 at 335 to by-pass contacts CBA, BP and CULX. When bypassing of the main floor is to be instituted by the stopping at a basement for a load requiring up travel and is to be combined with the aforenoted features switch 76 can be opened so that the opening of contact UBS at 334 opens the entire stopping circuit.

FIG. XIII also illustrates an alternative basement service relay and basement run relay circuit. In this circuit no reset of relay BS by reclosing of the car gate is provided and a car cannot retain its basement service assignment if it ascends to the first floor with basement calls still in registration. Only two energizing paths for relay BS are available. Car calls below the main floor close contact CBD at 343 to pull in the relay any time the car is not in up load status (when back contact CUL is closed). Hall calls complete the circuit by dropping relay BU to close contact BU at 341. While the car is descending this circuit is through BU at 341, DF and VR at 340, and any of A1, B1, C1 or S1D at 340 to 342.

Relay BS has but one seal circuit through its BS contact at 339. It is reset as the car begins leveling at the main floor on its return from the basement since back contact MG at 343 is opened by energized main floor relay MG, back contact UF at 342 is open while the car rises due to energized up generator field relay UF, and during leveling the leveling acceleration relay LA has its back contacts LA at 341 opened.

Since no retention of basement service assignment is possible after a car returns from a basement to the main landing, the basement run relay circuits are simplified as shown at 344 and 345. When a car effectively arrives at a basement its crosshead carries brush 82 into engagement with contact 83 at 344 to energize BR. BR remains energized through seal contact BR at 345 until the car either passes above the main floor and opens back contact AMF at 345 or the car is conditioned for loading by a load to be transported upward from the main floor and back contact CUL at 345 of the up load relay is opened.

Another adjunct to this system which improves basement service is the adjustment of dispatching intervals in response to the operations of basement serving cars. Only fragments of the dispatching timers are shown. As more fully disclosed in the aforenoted application, a dispatch signal is issued when a relay J3 is energized to close a contact J3 at 321 and energize a relay J3A. The circuit of FIG. XII further modifies the operation of J3A according to this invention so that it is delayed after J3 operates if a car is serving the basement, or a car assigned to basement service runs past the main floor on its up trip, and another car is in the up load status. If all of these conditions are met, the dispatch interval is abbreviated by the elimination of the dropout interval of TSX. Dispatch interval extension relay TSX is de-energized to close its contact TSX at 322 so that a car is dispatched when basic timer J3 times out relay J3A is energized. If the conditions are not coincident TSX is energized until J3 times out and opens its back contact J3 at 322 whereby the dispatch interval is extended. TSX may be set for about 10 seconds advantageously. If no car is in basement service contacts BS3 are all closed at 322 and TSX is energized. Similarly, if no car is in up load status, contact CULX at 324 is closed to energize TSX. A basement serving car opens its BS3 contact at 322. If that car is at the main terminal so that its MG contact at 323 is closed and it is not stopping so that its VR contact is closed, the open BS3 contact is by-passed to maintain TSX energized. Thus, it is seen that the dispatch interval is lengthened if any of the paths are available. The extension afforded by TSX is useful when a basement car is operating and another car is in load status since the basement car will return to the main terminal rapidly and become available for up travel therefrom. Accordingly, car spacing is enhanced by dispatching the load car early under these conditions.

When a basement serving car runs past the main floor without stopping and a load car is at that floor, it is desirable in the interest of better car spacing to recover the interval eliminated in the dispatch timer by the dropout of TSX. Under these circumstances two cars might travel upward in quick succession. To avoid this, the BS3 contacts at 322 are paralleled with a MG contact and a VR back contact at 323. A car which runs from the basement past the main floor before the current dispatch interval expires, measured by the energization of relay J3, causes the TSX interval to be superimposed on the J3 interval even though a car is in load status and contact CULX at 324 is open TSX is energized as the car's crosshead passes the main floor position to energize main floor relay MG and close its contact at 323 provided that car is not stopping. If the car is stopping at the main floor, it will have no effect on the current dispatch interval since stopping sequence relay contact VR at 323 will open before contact MG closes and no circuir for TSX will be completed around the open BS3 contact. As described, if TSX is not energized, the closure of contact J3 at 321 will energize J3A and dispatch a car immediately, if TSX is energized the opening of contact J3 at 322 initiates its dropout and J3A is energized to dispatch the car the TSX dropout interval following the energization of J3.

Another feature particularly adapted for systems having selective rejection of basements by each car and low call reversal is the locking of the doors of a car in the event it stops as by a low call reversal at a floor it is barred from serving. This situation can arise where another basement serving car cancels the low call. Door locking relay PDO appears at line 278 of FIG. X. It is individual to a car and operates from floor selector contacts 80 for the basement floors when a brush 81 engages one of those contacts which is effective. The contacts are made effective by basement reject relay contacts A1A, B1A and C1A in the case of car A for the A, B and C basement contacts 80 respectively. Thus, if basement B was locked out for car A, relay B1A would be energized to close contact B1A. When the A car stopped at the B basement, its VR contact at 278 would close and pull in relay PDO which would seal itself in by contact PDO at 276 until the car began to travel from the floor and opened its advance motor relay contact AMR at 276. Relay PDO prevents the release of the well-known retiring cam, despite opening of the conventional circuits controlling that cam, by closing contact PDO at 230 to energize its solenoid so that the cam cannot advance to unlock the doors and enable the door operator.

In recapitulation of this invention, an elevator system having a plurality of cars and a dispatching floor is provided with floors displaced from the dispatching floor in a first direction, above in the case of a lower dispatching floor, and a plurality of floors beyond the dispatching floor in a second direction opposite the first direction, below as basements. Service is afforded to these floors above by usual dispatching techniques. Cars approaching the dispatching floor from the first direction can be assigned to serve the floors beyond by calls individual to the car, car calls, for such floors. Calls common to the cars, as hall calls, will also effect the assignment if no other car is conditioned to respond to such calls. If no call is registered requiring a stop at the dispatching floor the car continues past that floor to serve the floor beyond calls.

Many of the functions discussed which involve car position are controlled from a floor selector machine the commutating device of which may lead into relative position the actual car position by an amount sufficient to conveniently control car slowdown and other functions. Accordingly, many of the sequenching operations referred to herein involve the effective car position, that position being established by the commutator. For example, where stopping is discussed, this type of commutator, to be effective, must not have passed the position at which it can pick up the signal when the stopping signal is established, and if it has passed that position, the car will not respond even though the car has not passed the actual position for that signal.

A car which has stopped at the dispatching floor can be assigned to serve the floors beyond under the same conditions as above. In addition, if the stop occurred before assignment, the car selection process employed at the dispatching floor enables a car for assignment to serve floors beyond in response to calls common to the cars.

Once a car is assigned to basement service it bars the assignment of another car in response to calls common to the cars except in those instances where an assigned car is not conditioned to serve the calls. Such instances include a call behind the car as a down floor beyond hall call above a descending car, a down call when the assigned car is ascending, and an up call below and ascending car. Another instance is the failure of the assigned car to respond as where it fails to begin moving for a given interval while assigned to floor beyond service. Each of these exceptions can be sensed in circuits individual to the cars; hence, when a plurality of cars have been assigned either by calls individual to those cars or by release of the assignment barring means by existence of one of the enumerated conditions still additional cars can be admitted to the assignment by further disabling of the assignment barring means.

Needless travel of a car assigned to floor beyond service is avoided by reversing that car at its farthest car call or the farthest hall call for travel in the second direction. Reversal can also be effected if another car cancels the hall call beyond the car.

Cars selected at the dispatching floor can be conditioned for loading for travel in the first direction. Conditioned cars are dispatched upon termination of a dispatching interval. That interval is altered by the assignment of cars to floor beyond service. A floor beyond serving car can decrease the interval sending a conditioned car away earlier than usual since the assigned car will return to the dispatching floor rapidly and becomes available to replace the conditioned car. If no conditioned car is available, the dispatch interval is not abbreviated. Recovery of all or a portion of the abbreviation of the interval occurs when a floor beyond serving car loses its assignment or travels past the dispatching floor in the first direction without stopping.

A floor beyond serving car in traveling toward the dispatching floor will stop if a call for the dispatching floor is registered. It can also be arranged to stop in the absence of calls for certain operating programs of the system, for certain car loadings, for the absence of a car call above the car, for the absence of a car conditioned for loading at the dispatching floor, and for the failure of a car to stop on its return trip to the dispatching floor for a call which would normally admit a load for the floors displaced in the first direction from the dispatching floor. These controlling factors can be employed either singly or in combination.

The disclosed system lends itself to many combinations of the several novel features and to utilization in many forms of elevator systems. Accordingly, the above description is to be read as illustrative and not as limiting the invention's spirit or scope.

I claim:

1. In an elevator system comprising a plurality of cars serving a plurality of floors, a dispatching floor from which cars are dispatched in a first direction, a plurality of floors beyond said dispatching floor in a second direction opposite said first direction, means for assigning cars in a predetermined condition to serve said floors beyond, call means common to the cars, means effective when a first car is assigned to serve said floors beyond for preventing operation of said assigning means in response to said common call means, and means for disabling said preventing means to enable assignment of a second car to serve a floor beyond in response to a common call which assigned cars are not conditioned to serve.

2. A combination according to claim 1 wherein said disabling means comprises means responsive to a call common to the cars which requires service at a floor beyond which is behind all cars currently assigned to serve floors beyond, whereby a call behind enables said assigning means.

3. A combination according to claim 1 wherein said disabling means comprises means responsive to calls common to the cars requiring service at a floor beyond in said second direction of travel which is displaced in said first direction from all cars assigned to serve floors beyond, whereby said call enables said assigning means.

4. A combination according to claim 1 wherein said disabling means comprises means indicating a car assigned to and serving floors beyond is conditioned for travel in said first direction, and means responsive to a floor beyond call common to the cars which is displaced in said second direction from the effective position of said car, whereby said car is prevented from operating said disabling means when traveling in said first direction at an effective position displaced in said first direction from said call.

5. A combination according to claim 1 wherein said disabling means comprises means responsive to the failure of a car to respond to floor beyond calls for preventing operation of said disabling means.

6. A combination according to claim 1 wherein said disabling means comprises means responsive to the response by a car to a floor beyond call common to the cars within a given interval of the previous response or the registration of a floor beyond call common to the cars, whichever occurred later, for enabling said disabling means.

7. A combination according to claim 1 wherein said disabling means comprises means responsive to the absence of a floor beyond call common to the cars behind a car assigned to floor beyond service for enabling said disabling means.

8. A combination according to claim 1 wherein said disabling means comprises means responsive to the absence of a floor beyond call displaced in said second direction from a car assigned to serve said floor beyond and conditioned to travel in said first direction for enabling said disabling means.

9. In an elevator system comprising a plurality of cars serving a plurality of floors, a dispatching floor from which cars are dispatched in a first direction, a plurality of floors beyond said dispatching floor in a second direction opposite said first direction, means for automatically stopping a car traveling in said second direction toward said dispatching floor, means for assigning cars traveling in said second direction toward said dispatching floor to serve said floors beyond and to disable said automatic stopping means in response to a call common to the cars for service at a floor beyond which another car then serving the floors beyond is not conditioned to serve.

10. In an elevator system comprising a plurality of cars serving a plurality of floors, a dispatching floor from which cars are dispatched in a first direction, a plurality of floors beyond said dispatching floor in a second direction opposite said first direction, means for automatically stopping a car traveling in said second direction toward said dispatching floor, means for assigning cars traveling in said second direction toward said dispatching floor to serve said floors beyond and to disable said automatic stopping means in response to a call common to the cars for service at a floor beyond which is behind all other cars then serving the floors beyond.

11. In an elevator system comprising a plurality of cars serving a plurality of floors, a dispatching floor from which cars are dispatched in a first direction, a plurality of floors beyond said dispatching floor in a second direction opposite said first direction, means for assigning a car to serve said floors beyond in response to a call common to the cars and at said dispatching floor for travel in said second direction, means starting an assigned car in said second direction from said dispatching floor, means for registering calls individual to the cars and means responsive to the conditioning of an assigned car for starting in said second direction from said dispatching floor and the absence of a call individual to the assigned car for cancelling said common call at the dispatching floor, for cancelling the assignment of said car and for disabling said starting means.

12. In an elevator system comprising a plurality of cars serving a plurality of floors, a dispatching floor from which cars are dispatched in a first direction, a plurality of floors beyond said dispatching floor in a second direction opposite said first direction, means for assigning a car to serve said floors beyond in response to a call common to the cars and at said dispatching floor for travel in said second direction, means starting an assigned car in said second direction from said dispatching floor, means for registering calls individual to the cars, a gate for each car, and means responsive in the absence of the registration of a call for a floor beyond individual to the assigned car prior to a predetermined degree of closing of the gate of the assigned car for cancelling its assignment and disabling said starting means.

13. In an elevator system comprising a plurality of cars serving a plurality of floors, a dispatching floor from which cars are dispatched in a first direction, a plurality of floors beyond said dispatching floor in a second direction opposite said first direction, means for assigning cars in a predetermined condition to serve said floors beyond, means for starting an assigned car in said second direction from said dispatching floor and means for reversing a floor beyond serving car when said car has traveled to or beyond the farthest floor beyond in the second direction for which service is required.

14. In an elevator system comprising a plurality of cars serving a plurality of floors, a dispatching floor from which cars are dispatched in a first direction, a plurality of floors beyond said dispatching floor in a second direction opposite said first direction, means for assigning cars in a predetermined condition to serve said floors beyond, means for registering calls individual to the cars, means for starting an assigned car in said second direction from said dispatching floor and means for reversing a floor beyond serving car when said car is effectively displaced in the second direction beyond all registered common calls for floors beyond and all registered calls individual to the assigned car.

15. In an elevator system comprising a plurality of cars serving a plurality of floors, a dispatching floor from which cars are dispatched in a first direction, a dispatch timer for defining dispatching intervals at said dispatching floor a floor beyond said dispatching floor in a second direction opposite said first direction, means for assigning a car to floor beyond service, and means responsive to the assignment of a car to floor beyond service for altering the interval defined by said dispatch timer.

16. In an elevator system comprising a plurality of cars serving a plurality of floors, a dispatching floor from which cars are dispatched in a first direction, a dispatch timer for defining dispatching intervals at said dispatching floor a floor beyond said dispatching floor in a second direction opposite said first direction, means for conditioning a car to receive a load for transfer in said first direction, means for assigning a car to floor beyond service and means responsive to a coincidence of a conditioned car and an assigned car for altering the interval defined by said dispatch timer.

17. A combination in accordance with claim 16 wherein the interval defined by said dispatch timer is abbreviated in response to a coincidence of a conditioned car and an assigned car.

18. In an elevator system comprising a plurality of cars serving a plurality of floors, a dispatching floor from which cars are dispatched in a first direction, a dispatch timer for defining dispatching intervals at said dispatching floor a floor beyond said dispatching floor in a second direction opposite said first direction, means for conditioning a car for dispatching, means for assigning a car for service to a floor beyond, means responsive to a coincidence of a conditioned car and an assigned car for abbreviating the dispatch timer interval, and means responsive to the travel in said first direction of an assigned car past said dispatching floor for recovering a portion of the abbreviated dispatch timer interval.

19. In an elevator system comprising a plurality of cars serving a plurality of floors, a dispatching floor from which cars are dispatched in a first direction, a dispatch timer for defining dispatching intervals at said dispatching floor a floor beyond said dispatching floor in a second direction opposite said first direction, means for assigning a car to floor beyond service, and means responsive to the assignment of a car to floor beyond service for reducing the interval defined by said dispatch timer.

20. In an elevator system comprising a plurality of cars serving a plurality of floors, a dispatching floor from which cars are dispatched in a first direction, a dispatch timer for defining dispatching intervals at said dispatching floor a floor beyond said dispatching floor in a second direction opposite said first direction, means for assigning a car to floor beyond service, means responsive to the assignment of a car to floor beyond service for reducing the interval defined by said dispatch timer, and means responsive to the cancellation of said assignment prior to the expiration of said reduced timer interval for increasing said reduced interval.

21. In an elevator system comprising a plurality of cars serving a plurality of floors, a dispatching floor from which cars are dispatched in a first direction, a dispatch timer for defining dispatching intervals at said dispatching floor a floor beyond said dispatching floor in a second direction opposite said first direction, means for assigning a car to floor beyond service, means responsive to the assignment of a car to floor beyond service for reducing the interval defined by said dispatch timer, and means responsive to the travel in said first direction of an assigned car beyond said dispatching floor prior to the expiration of said reduced timer interval for increasing said reduced interval.

22. In an elevator system comprising a plurality of cars serving a plurality of floors, a dispatching floor from which cars are dispatched in a first direction, a floor beyond said dispatching floor in a second direction opposite said first direction, a call means common to the cars for indicating a service requirement for travel from said dispatching floor in said first direction, a call means individual to each car for said dispatching floor, means for stopping a car which is traveling in said first direction toward said dispatching floor at said floor in response to operation of said individual or common call means, and means responsive to a given loading of a car traveling in said first direction toward said dispatching floor for stopping said car at said dispatching floor.

23. In an elevator system comprising a plurality of cars serving a plurality of floors, a dispatching floor from which cars are dispatched in a first direction, a floor beyond said dispatching floor in a second direction opposite said first direction, a call means common to the cars for indicating a service requirement for travel from said dispatching floor in said first direction, a call means individual to each car for said dispatching floor, means for stopping a car which is traveling in said first direction toward said dispatching floor at said floor in response to operation of said individual or common call means, and means effective when said system is operating on a given program and ineffective when said system is operating on a second program for stopping a car traveling in said first direction toward said dispatching floor at said dispatching floor.

24. In an elevator system comprising a plurality of cars serving a plurality of floors, a dispatching floor from which cars are dispatched in a first direction, a floor beyond said dispatching floor in a second direction opposite said first direction, a call means common to the cars for indicating a service requirement for travel from said dispatching floor in said first direction, a call means individual to each car for said dispatching floor, means for stopping a car which is traveling in said first direction toward said dispatching floor at said floor in response to operation of said individual or common call means, means conditioning a car to receive a load at the dispatching floor for travel in said first direction, and means responsive to the absence of a conditioned car at the dispatching floor for stopping at said floor a car traveling in said first direction toward said dispatching floor.

25. In an elevator system comprising a plurality of cars serving a plurality of floors, a dispatching floor from which cars are dispatched in a first direction, a plurality of floors beyond said dispatching floor in a second direction opposite said first direction, a call means common to the cars for indicating a service requirement for travel from said dispatching floor in said first direction, a call means individual to each car for said dispatching floor, means for stopping a car which is traveling in said first direction toward said dispatching floor at said floor in response to operation of said individual or common call means, means sensing the stop of a car at a floor beyond for a load requiring travel in said first direction toward said dispatching floor, and means responsive to a sensed stop for stopping at said dispatching floor said car traveling in said first direction toward said dispatching floor.

26. In an elevator system comprising a plurality of cars serving a plurality of floors, a dispatching floor from which cars are dispatched in a first direction, a floor beyond said dispatching floor in a second direction opposite said first direction, a call means common to the cars for indicating a service requirement for travel from said dispatching floor in said first direction, a call means individual to each car for said dispatching floor, means for stopping a car which is traveling in said first direction toward said dispatching floor at said floor in response to operation of said individual or common call means, first means sensing the absence of a given load in a car, second means sensing the absence of a call in a car for a floor displaced in said first direction from the dispatching floor, and means stopping at said dispatching floor a car traveling in said first direction toward said dispatching floor in response to a coincidence of operation of said first and second means.

27. In an elevator system comprising a plurality of cars serving a plurality of floors, a dispatching floor from which cars are dispatched in a first direction, a plurality of floors beyond said dispatching floor in a second direction opposite said first direction, means for assigning cars to serve said floors beyond, means for preventing operation of said assigning means in response to a condition common to the cars while another car is assigned to serve said floors beyond, and means for enabling operation of said assigning means while another car is assigned to serve said floors beyond when no individual car of the group is conditioned to serve a call registered at a floor beyond.

28. In an elevator system comprising a plurality of cars serving a plurality of floors, a dispatching floor from which cars are dispatched in a first direction, a plurality of floors beyond said dispatching floor in a second direction opposite said first direction, means for assigning cars to serve said floors beyond, means for preventing operation of said assigning means in response to a condition common to the cars while another car is assigned to serve said floors beyond, and means for enabling operation of said assigning means while another car is assigned to serve said floors beyond when no car assigned to serve said floors beyond initiates floor beyond service within a given interval.

No references cited.